US010967737B2

(12) United States Patent
Tanaka

(10) Patent No.: US 10,967,737 B2
(45) Date of Patent: Apr. 6, 2021

(54) INPUT DEVICE FOR VEHICLE AND INPUT METHOD

(71) Applicant: Panasonic Intellectual Property Management Co., Ltd., Osaka (JP)

(72) Inventor: Tsuyoshi Tanaka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 208 days.

(21) Appl. No.: 16/464,710

(22) PCT Filed: Dec. 11, 2017

(86) PCT No.: PCT/JP2017/044294
§ 371 (c)(1),
(2) Date: May 29, 2019

(87) PCT Pub. No.: WO2018/110482
PCT Pub. Date: Jun. 21, 2018

(65) Prior Publication Data
US 2019/0322176 A1    Oct. 24, 2019

(30) Foreign Application Priority Data
Dec. 16, 2016    (JP) .............................. JP2016-244509

(51) Int. Cl.
*G06F 3/0362*    (2013.01)
*B60K 37/06*    (2006.01)
(Continued)

(52) U.S. Cl.
CPC .............. *B60K 37/06* (2013.01); *B60K 35/00* (2013.01); *G06F 3/0362* (2013.01); *G06F 3/0488* (2013.01)

(58) Field of Classification Search
CPC ............................ G06F 3/0362; G06F 3/0488
See application file for complete search history.

(56) References Cited

U.S. PATENT DOCUMENTS 5,136,548 A * 8/1992 Claar ................. G07C 9/00182
367/137
6,246,127 B1 * 6/2001 Weilbacher ............ B60K 20/06
307/9.1
(Continued)

FOREIGN PATENT DOCUMENTS

JP    2010-191713    9/2010
JP    2013-186860    9/2013
(Continued)

OTHER PUBLICATIONS

International Search Report of PCT application No. PCT/JP2017/044294 dated Jan. 30, 2018.

*Primary Examiner* — David E Choi
(74) *Attorney, Agent, or Firm* — Greenblum & Bernstein, P.L.C.

(57) ABSTRACT

An input device for a vehicle that performs input for operating a user interface (UI) displayed by a display disposed in a vehicle includes: a touch sensor that receives a touch input by a user; and a controller that selects, when the touch input into the touch sensor is a touch with a plurality of fingers or a plurality of taps, a region corresponding to the count of touches with the fingers or the count of taps, from among a plurality of regions displayed by the display.

12 Claims, 18 Drawing Sheets

(51) Int. Cl.
  *B60K 35/00*   (2006.01)
  *G06F 3/0488*  (2013.01)

(56) References Cited

U.S. PATENT DOCUMENTS

| | | | |
|---|---|---|---|
| 10,156,906 B2* | 12/2018 | Yamamoto | G06K 9/00335 |
| 2003/0171190 A1* | 9/2003 | Rice | A63F 13/06 |
| | | | 482/57 |
| 2005/0241930 A1* | 11/2005 | Stevenson | H01H 13/702 |
| | | | 200/512 |
| 2007/0281828 A1* | 12/2007 | Rice | A63F 13/245 |
| | | | 482/4 |
| 2015/0127674 A1 | 5/2015 | Ito | |
| 2016/0103554 A1* | 4/2016 | Moriai | G06F 3/04886 |
| | | | 345/173 |
| 2016/0274664 A1* | 9/2016 | Buttolo | H03K 17/955 |
| 2016/0291731 A1* | 10/2016 | Liu | G06F 3/0488 |
| 2016/0306541 A1* | 10/2016 | Fang | G06F 3/0481 |
| 2016/0328144 A1* | 11/2016 | Agrawal | G06F 3/04847 |
| 2016/0344386 A1* | 11/2016 | Buttolo | H03K 17/955 |
| 2017/0041987 A1* | 2/2017 | Weber | B32B 17/10761 |
| 2017/0060230 A1* | 3/2017 | Faaborg | G06F 3/012 |
| 2017/0205891 A1* | 7/2017 | Mason | H04M 1/72412 |
| 2017/0315824 A1* | 11/2017 | Ochiai | B60K 37/06 |
| 2018/0052537 A1* | 2/2018 | Gong | G06F 3/041 |
| 2019/0322176 A1* | 10/2019 | Tanaka | B60K 35/00 |
| 2020/0269809 A1* | 8/2020 | Sanji | B60R 25/31 |

FOREIGN PATENT DOCUMENTS

| | | |
|---|---|---|
| JP | 2015-088119 | 5/2015 |
| WO | 2015/004848 | 1/2015 |

\* cited by examiner

INPUT DEVICE FOR VEHICLE AND INPUT METHOD

CROSS-REFERENCE TO RELATED APPLICATIONS

This application is a U.S. national stage application of the PCT International Application No. PCT/JP2017/044294 filed on Dec. 11, 2017, which claims the benefit of foreign priority of Japanese patent application No. 2016-244509 filed on Dec. 16, 2016, the contents all of which are incorporated herein by reference.

TECHNICAL FIELD

The present invention relates to an input device for a vehicle for performing input for operating a user interface (UI) displayed by a display disposed in the vehicle, and an input method of the input device.

BACKGROUND ART

Conventionally, it is disclosed, when an image on a display is divided into a plurality of images and displayed, based on positions of a plurality of fingers detected on a touch panel as an input device, that a right screen is determined as an operation target screen if the positions are on the right side, and that a left screen is determined if the positions are on the left side (for example, refer to PTL 1).

CITATION LIST

Patent Literature

PTL 1: WO 2015/004848

SUMMARY OF THE INVENTION

The present invention provides an input device that can inhibit recognition of an unintended input into the UI displayed on the display even when a user is doing other work.

An input device for a vehicle according to one aspect of the present invention is an input device for a vehicle that performs input for operating a user interface (UI) displayed by a display disposed in the vehicle, and includes a touch sensor and a controller. The touch sensor receives a touch input performed with a finger of a user. The controller selects, when the touch input into the touch sensor is a touch in which a plurality of fingers is in contact with the touch sensor simultaneously or a tap in which at least one finger repeats a plurality of contacts with the touch sensor within a predetermined time, a region corresponding to a count of contacts of the touch or a count of contacts of the tap from among a plurality of regions constituting a display region of the display.

Note that these comprehensive or specific aspects may be implemented by a system, a method, an integrated circuit, a computer program, or a (non-transitory) recording medium such as a computer readable compact disc read-only memory (CD-ROM), or may be implemented by any combination of the system, the method, the integrated circuit, the computer program, and the recording medium.

The input device of the present invention can inhibit recognition of an unintended input into the UI displayed on the display even when the user is doing other work.

DESCRIPTION OF EMBODIMENT

Figure 1:
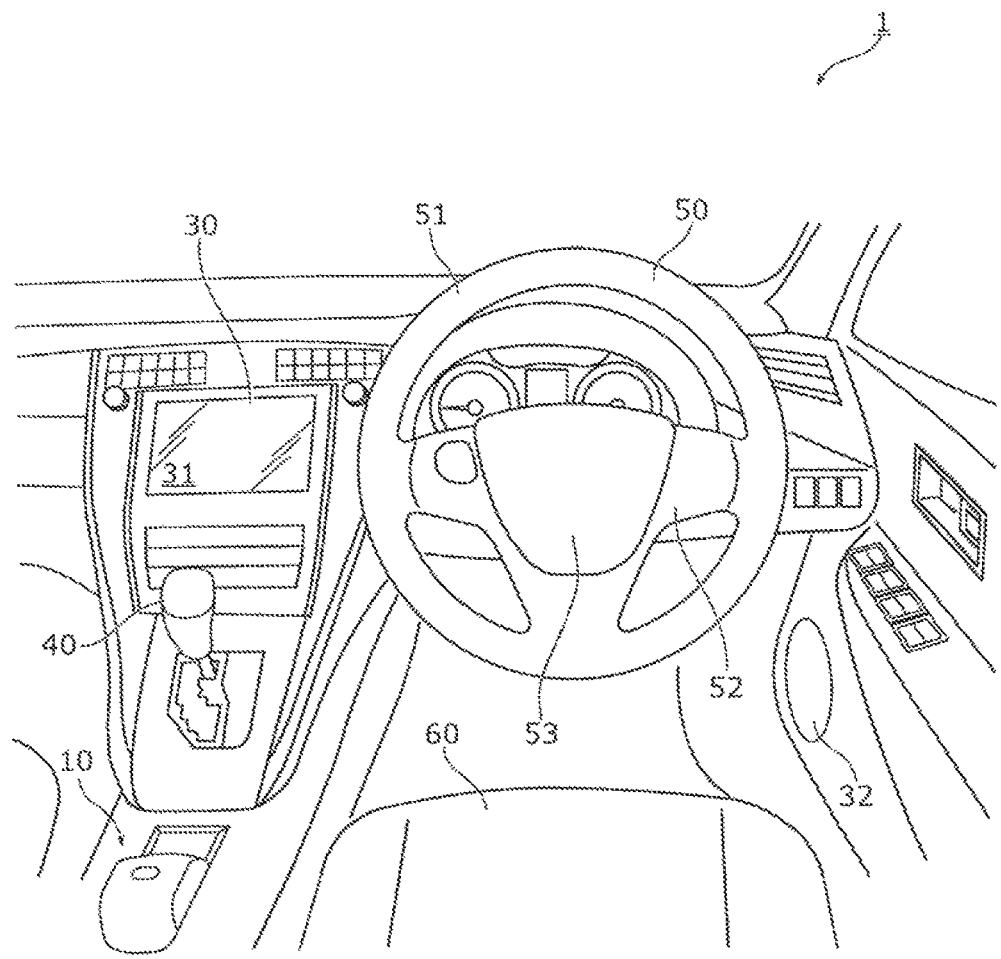
FIG. 1 is a view showing an example of a configuration of an input device and a cabin of a vehicle in which the input device is disposed according to an exemplary embodiment.

Prior to describing an exemplary embodiment of the present invention, problems of a conventional device and method will be described briefly. According to the technique of PTL 1, during driving of a vehicle, a user drives the vehicle while carefully watching forward. Therefore, it is difficult for the user to be conscious of a position of a finger with respect to a touch panel during driving, and there is a risk of erroneously selecting an UI displayed on the touch panel.

An input device according to one aspect of the present invention is an input device for a vehicle for performing input for operating a user interface (UI) displayed by a display disposed in the vehicle. The input device includes: a touch sensor that receives a touch input performed with a finger of a user; and a controller that selects, when the touch input into the touch sensor is a touch in which a plurality of the fingers is in contact with the touch sensor simultaneously or a tap in which at least one finger repeats a plurality of contacts with the touch sensor within a predetermined time, a region corresponding to a count of contacts of the touch or a count of contacts of the tap from among a plurality of regions constituting a display region of the display.

Accordingly, since the controller selects the region corresponding to the count of fingers or the count of taps from among the plurality of regions constituting the display region of the display, the controller can accurately select the intended region without being conscious of positions of the fingers with respect to the touch sensor while the user is driving. This makes it possible to inhibit recognition of an unintended input into the UI displayed by the display even when the user is doing other work.

Also, when the touch input that is input into the touch sensor is the touch or the tap, the controller may display a gesture guide associating a type of gesture that is input into the touch sensor thereafter with an icon indicating a screen to be displayed according to the type of gesture in the selected region of the display.

This makes it possible to indicate to the user that the gesture guide is active, and to allow the user to recognize the screen to be displayed by the display by the gesture to input thereafter before the screen is displayed. Therefore, the user can appropriately select the gesture input for displaying a desired screen, and can easily display the desired screen.

Also, when the touch input into the touch sensor is a first gesture input by the touch or a second gesture input after the tap, the controller may perform switching processing to switch from a first display screen displayed by the display to a second display screen different from the first display screen and to cause the display to perform display.

Accordingly, the controller, which performs the switching processing by the first gesture input using a plurality of fingers or the second gesture input after a plurality of taps, can inhibit recognition of an unintended input.

Also, the touch sensor may include a first touch sensor that is disposed at a position within a range where a hand of the user almost reaches while the user aboard the vehicle is seated on a seat of the vehicle, the position excluding a steering wheel of the vehicle, and when the touch input into the first touch sensor is the first gesture input, the controller may perform the switching processing.

This allows the user to easily perform the first gesture input into the first touch sensor.

Also, when the count of contacts of the touch of the first gesture input that is input into the first touch sensor is the count of contacts of a first touch, the controller may cause the display to display an operation guide screen indicating an operation for adjusting a setting to a vehicle-mounted device included in the vehicle as the second display screen.

This allows the display to easily display the operation guide screen.

Also, a dial switch that is disposed adjacent to the first touch sensor and receives dial input may be further included. The controller may cause the display to display a screen indicating the setting to the vehicle-mounted device adjusted by operating the dial switch as the operation guide screen.

This allows the display to easily display the operation guide screen of the dial switch.

Also, the controller may switch a type of the operation indicated on the operation guide screen according to the type of the gesture of the first gesture input that is input into the first touch sensor, and the controller may switch a type of the setting adjusted by operating the dial switch.

This makes it possible to easily switch the function of the dial switch.

Also, the controller may receive an input tracing the touch sensor in a predetermined direction out of the first gesture input by the touch of the count of contacts of the first touch, and according to the predetermined direction indicated by the received first gesture input, the controller may switch the type of the operation indicated on the operation guide screen, and switch the type of the setting adjusted by operating the dial switch.

This allows the display to easily display the desired operation guide screen among the plurality of operation guide screens.

Also, when the count of contacts of the touch of the first gesture input that is input into the first touch sensor is a count of contacts of a second touch different from the count of contacts of the first touch, the controller may cause the display to display an operation screen for receiving the operation by the user to the vehicle-mounted device as the second display screen.

This allows the display to easily display the operation screen.

Also, the controller may receive an input tracing the touch sensor in the predetermined direction or in an opposite direction of the predetermined direction, out of the first gesture input by the touch of the count of contacts of the second touch, when the received first gesture input is the predetermined direction, the controller may switch a plurality of types of the operation screen in preset order, and when the received first gesture input is the opposite direction, the controller may switch the plurality of types of the operation screen in order opposite to the order.

This allows the display to easily display the desired operation screen among the plurality of operation screens.

Also, the touch sensor may include a second touch sensor disposed in the steering wheel of the vehicle, and when the touch input into the second touch sensor is the second gesture input, the controller may perform the switching processing.

This allows the user to easily perform the second gesture input into the second touch sensor disposed in the steering wheel. This makes it possible to inhibit recognition of an unintended input even when the user is driving.

Note that these comprehensive or specific aspects may be implemented by a system, a method, an integrated circuit, a computer program, or a recording medium such as a computer readable CD-ROM, or may be implemented by any combination of the system, the method, the integrated circuit, the computer program, and the recording medium.

Hereinafter, an input device and an input method according to one aspect of the present invention will be specifically described with reference to the drawings.

Note that each of the following exemplary embodiments illustrates one specific example of the present invention. Numerical values, shapes, materials, constituent elements, arrangement positions and connection modes of the constituent elements, steps, and an order of the steps that are illustrated in the following exemplary embodiment are each example and therefore are not intended to limit the present invention. Furthermore, among the constituent elements in the following exemplary embodiments, the constituent elements not recited in the independent claims indicating the broadest concept are described as optional constituent elements.

Exemplary Embodiment

[1-1. Configuration of Input Device]

First, with reference to FIG. 1, a configuration of an input device and a cabin of a vehicle in which the input device is disposed according to the exemplary embodiment will be described. FIG. 1 is a view showing an example of a configuration of an input device and a cabin of a vehicle in which the input device is disposed according to the exemplary embodiment. Note that in the following description, a forward direction, a rearward direction, a rightward direction, and a leftward direction are defined based on a traveling direction of the vehicle. Also, in a state where wheels of the vehicle are attached to the ground, an upward direction, a downward direction, a horizontal direction, and a vertical direction are defined.

First input unit 10 constituting the input device and vehicle-mounted device 30 are mounted in the cabin of automobile 1 (an example of the vehicle) shown in FIG. 1. In addition, shift lever 40 and steering wheel 50 are further disposed in the cabin of automobile 1. Here, the input device is a device that performs input for operating a user interface (UI) displayed by display 31 of vehicle-mounted device 30 mounted on the vehicle such as automobile 1.

First input unit 10 is an input interface for operating the UI displayed on display 31 of vehicle-mounted device 30. By operating the UI, a user can control vehicle-mounted device 30 mounted on automobile 1.

First input unit 10 is disposed rearward of shift lever 40. That is, first input unit 10 is disposed at a position within a range where a user's hand almost reaches while the user aboard automobile 1 is seated on seat 60, the position excluding steering wheel 50. A driver, who is the user, can operate vehicle-mounted device 30 by performing input into first input unit 10 disposed rearward of shift lever 40 with a left hand. Note that first input unit 10 may not be disposed at the above position as long as first input unit 10 is disposed at the position within a range where the user's hand almost reaches, the position excluding steering wheel 50. Note that FIG. 1 illustrates an automobile with a right-hand steering wheel, but this applies to an automobile with a left-hand steering wheel because only right and left hand become opposite for the automobile with the left-hand steering wheel. In some cases, not only the user seated in a driver seat but also a user seated in a passenger seat can perform the operation.

Steering wheel 50 is for steering automobile 1. Steering wheel 50 includes: rim 51 having a ring shape; spoke 52 having an approximately T-shape and integrally formed on an inner peripheral surface of rim 51; and horn switch cover 53 covering a horn switch (not shown) disposed at a central part of spoke 52. A configuration of first input unit 10 will be described in detail later.

Vehicle-mounted device 30 is, for example, a car navigation system, an audio device for playing back an optical disk, a video playback device, and the like. Vehicle-mounted device 30 includes display 31. Display 31 displays information such as a map for performing car navigation, a played back video, the UI for operating vehicle-mounted device 30, and the UI for controlling other vehicle-mounted devices. Display 31 is implemented by, for example, a liquid crystal display or an organic electro luminescence (EL) display. Vehicle-mounted device 30 may be connected to speaker 32 and output a sound to speaker 32. Furthermore, the other vehicle-mounted devices may include, for example, an air conditioner, and a configuration may be provided such that an operation of the air conditioner is controlled by an input into the input device.

Next, a hardware configuration of first input unit 10 will be described with reference to FIG. 2.

Figure 2:
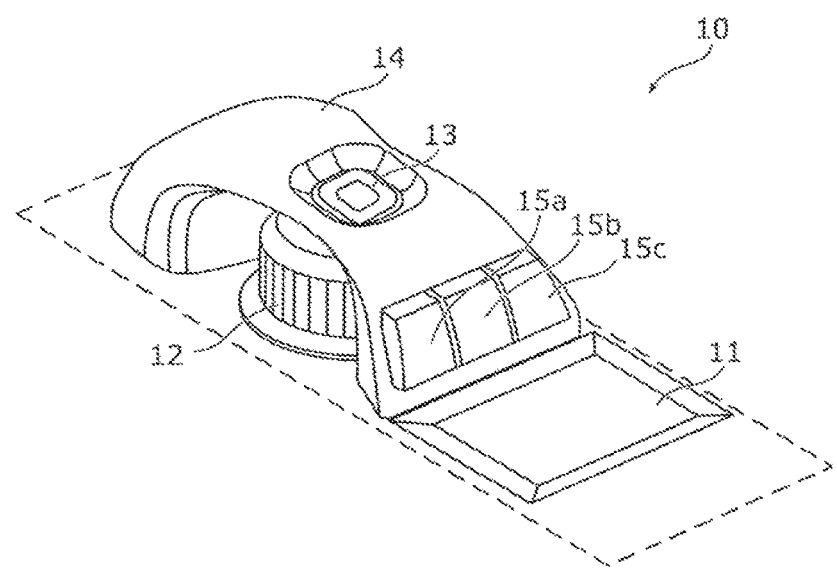
FIG. 2 is an external perspective view of a first input unit viewed from a front in a traveling direction of the vehicle.

FIG. 2 is an external perspective view of the first input unit viewed from a front of a traveling direction of the vehicle.

First input unit 10 includes first touch sensor 11. First input unit 10 may further include dial switch 12, determination switch 13, palm rest 14, first switch 15a, second switch 15b, and third switch 15c.

First touch sensor 11 is a sensor that receives a touch input by the user, and is, for example, a touch pad. That is, first touch sensor 11 is a sensor that detects a position touched by part of user's body (for example, a finger). The touch with a plurality of fingers means that the plurality of fingers performs contacts with the touch sensor within the same time. At least a plurality of contacts with the touch sensor is required even if the contacts are contacts with the touch sensor for a short time, contacts for a long time such as pressing and holding, and tracing contacts. Part of a body other than fingers may be recognized. Moreover, to discriminate between a touch pen and a finger, it may be determined that a contact with a predetermined area or more is a finger touch. In the present exemplary embodiment, first touch sensor 11 is disposed in parallel with a horizontal direction.

Note that the first touch sensor may be disposed in parallel with a vertical direction. In this case, the first touch sensor may be disposed so as to face rearward, for example.

Dial switch 12 is a dial switch that is disposed rearward of first touch sensor 11 and rotates about a rotation axis extending along a vertical direction. That is, dial switch 12 is a dial switch that is disposed adjacent to the first touch sensor and receives dial input. Dial switch 12 has a substantially cylindrical shape protruding above an upper surface of first touch sensor 11. Dial switch 12 is configured to rotate by a predetermined angle unit. That is, the user can easily perform step-by-step adjustment by turning dial switch 12. Note that dial switch 12 does not need to be disposed rearward of first touch sensor 11, and may be disposed forward of, on a right side of, or on a left side of first touch sensor 11.

Determination switch 13 is a pressing switch disposed on dial switch 12.

Palm rest 14 is a structure on which to place a user's palm when the user performs input into first touch sensor 11, dial switch 12, determination switch 13, first switch 15a, second switch 15b, and third switch 15c included in first input unit 10. Specifically, palm rest 14 is an upwardly protruding arch-shaped structure covering an upper portion of dial switch 12 with left and right side surfaces of dial switch 12 being exposed. Palm rest 14 has an opening provided above dial switch 12 and is configured to allow determination switch 13 to be pushed through the opening. Palm rest 14 serves as a guide for determining a position of a finger such that the user can bring the finger into contact with the touch sensor without visually recognizing the touch sensor. The guide may be anything that can be recognized through touching with a hand even if the guide is not the palm rest.

First switch 15a, second switch 15b, and third switch 15c are pressing switches arranged side by side in a left-right direction on a front side surface of palm rest 14.

The user can operate the UI displayed on display 31 of vehicle-mounted device 30 by performing input into the touch sensor or various switches included in first input unit 10.

[1-2. Functional Configuration of Input Device]

Next, a functional configuration of the input device will be described.

Figure 3:
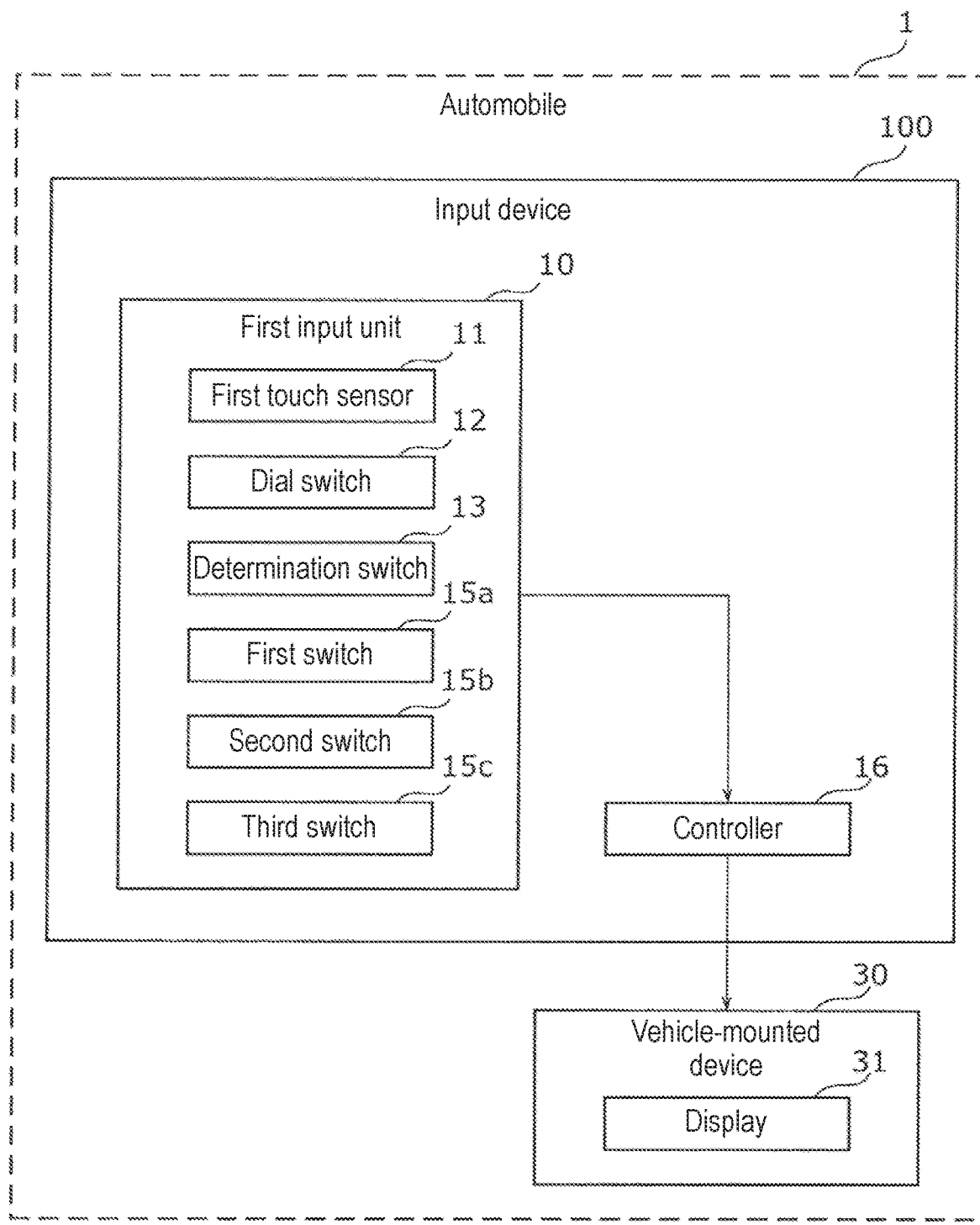
FIG. 3 is a block diagram showing an example of a functional configuration of the input device mounted in an automobile according to the exemplary embodiment.

FIG. 3 is a block diagram showing an example of the functional configuration of the input device mounted in an automobile according to the exemplary embodiment.

As shown in FIG. 3, input device 100 includes first input unit 10 and controller 16.

First input unit 10 includes first touch sensor 11, dial switch 12, determination switch 13, first switch 15a, second switch 15b, and third switch 15c. When input is performed into first touch sensor 11, dial switch 12, determination switch 13, first switch 15a, second switch 15b, or third switch 15c, an input signal indicating the input is output to controller 16.

In response to the input signal output from first input unit 10, controller 16 transmits a control signal for controlling vehicle-mounted device 30. Specifically, when the touch input into first touch sensor 11 is a touch with a plurality of fingers or a plurality of taps, controller 16 selects a region corresponding to the count of fingers or the count of taps from among a plurality of regions constituting a display region of display 31 of vehicle-mounted device 30, first region R1 to third region R3 (see FIG. 4, for example). Then, when the touch input into first touch sensor 11 is a first gesture input with the plurality of fingers or a second gesture input after the plurality of taps, controller 16 performs switching processing to switch from a first display screen displayed by display 31 to a second display screen different from the first display screen and to cause display 31 to display the second display screen. The plurality of taps means that at least one finger repeats a plurality of contacts with the touch sensor within a predetermined time. Part of a body other than the fingers may be recognized.

Figure 4:
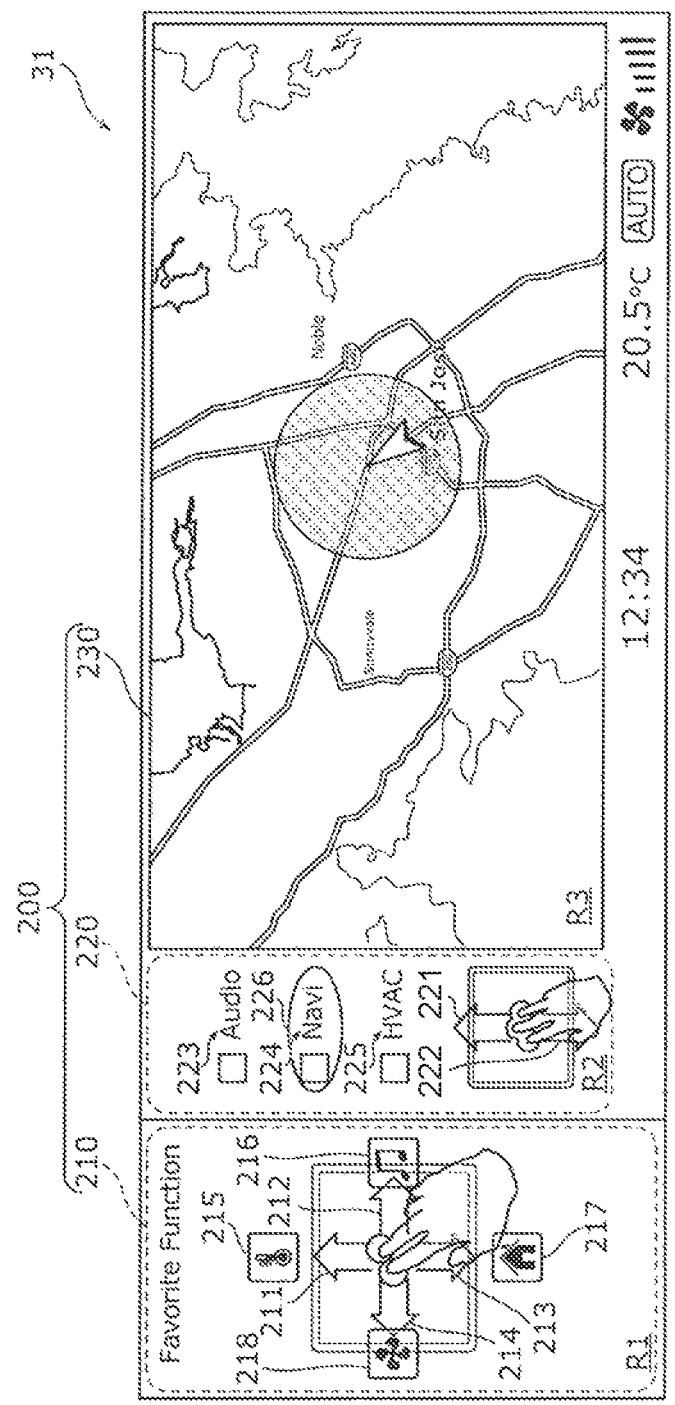
FIG. 4 is a view showing an example of a first display screen displayed on a display.

For example, as shown in FIG. 4, controller 16 causes display 31 of vehicle-mounted device 30 to display the first display screen. FIG. 4 is a view showing an example of the first display screen displayed on the display.

As shown in FIG. 4, controller 16 causes display 31 of vehicle-mounted device 30 to display screen 200 including first gesture guide 210, second gesture guide 220, and operation screen 230. Note that in third region R3 of display 31 in which operation screen 230 is displayed in FIG. 4, in response to the input into first input unit 10 by the user, controller 16 displays another operation screen different from operation screen 230 or an operation guide screen.

First gesture guide 210 is displayed on first region R1 on a left side among a plurality of (here, three) regions constituting the display region of display 31, first region R1 to third region R3. First gesture guide 210 includes a plurality of types of gestures 211 to 214 with a first count of fingers, and icons 215 to 218 respectively associated with the plurality of types of gestures 211 to 214 and indicating types of operation guide screen to be displayed next as the second display screen when the input of the associated type of gesture is performed. The plurality of types of gestures 211 to 214 indicates inputs that trace first touch sensor 11 with the first count of fingers in a predetermined direction. The first count is, for example, two.

Specifically, gesture 211 indicates an input tracing first touch sensor 11 with two fingers in a forward direction. Gesture 212 indicates an input tracing first touch sensor 11 with two fingers in a rightward direction. Gesture 213 indicates an input tracing first touch sensor 11 with two fingers in a rearward direction. Gesture 214 indicates an input tracing first touch sensor 11 with two fingers in a leftward direction.

Note that when the first touch sensor is disposed in parallel with a vertical direction so as to face rearward, gesture 211 indicates an input tracing first touch sensor 11 with two fingers in an upward direction, and gesture 213 indicates an input tracing first touch sensor 11 with two fingers in a downward direction.

Meanwhile, icon 215 is an icon associated with gesture 211 and indicating display, on display 31, of an operation guide screen for adjusting heating and cooling temperature setting of the air conditioner for heating, cooling, and ventilating automobile 1 when a gesture input indicated by gesture 211 is performed.

Icon 216 is an icon associated with gesture 212 and indicating display, on display 31, of an operation guide screen for selecting a song title of a music player when a gesture input indicated by gesture 212 is performed.

Icon 217 is an icon associated with gesture 213 and indicating display, on display 31, of an operation guide screen for setting going home in the car navigation when a gesture input indicated by gesture 213 is performed.

Icon 218 is an icon associated with gesture 214 and indicating display, on display 31, of an operation guide screen for adjusting air volume setting of the air conditioner of automobile 1 when a gesture input indicated by gesture 214 is performed.

Second gesture guide 220 is displayed on second region R2, which is a right neighbor to first region R1, among three regions constituting the display region of display 31, first region R1 to third region R3. Second gesture guide 220 includes a plurality of types of gestures 221, 222 with a second count (for example, three), and ions 223 to 225 respectively associated with the plurality of types of gestures 221, 222 and indicating types of operation screens to be displayed next as the second display screen when an input of the associated type of gesture is performed. Also, second gesture guide 220 may include focus display 226. Focus display 226 indicates that the operation screen corresponding to an icon on which focus display 226 is currently focused is the operation screen displayed on third region R3 on a right side among the three regions constituting the display region of display 31, first region R1 to third region R3. The plurality of types of gestures 221, 222 indicates the input tracing first touch sensor 11 with the second count of fingers in a predetermined direction or in an opposite direction of the predetermined direction. The second count is, for example, three.

Specifically, gesture 221 indicates an input tracing first touch sensor 11 with three fingers in a forward direction. Gesture 222 indicates an input tracing first touch sensor 11 with three fingers in a rearward direction. Note that in this case, gestures 221, 222 are inputs tracing in forward and rearward directions, respectively, but may be inputs tracing in left and right directions, respectively.

Note that when the first touch sensor is disposed in parallel with a vertical direction so as to face rearward, gesture 221 indicates an input tracing first touch sensor 11 with three fingers in an upward direction, and gesture 222 indicates an input tracing first touch sensor 11 with three fingers in a downward direction.

Meanwhile, icons 223 to 225 indicate operation screens to be displayed in third region R3 when selected. That is, controller 16 displays, in third region R3, the operation screen indicated by the icon focused by focus display 226. Also, icons 223 to 225 are arranged in preset order for displaying a plurality of types of operation screens.

Icon 223 is an icon indicating that, when focused by focus display 226, the operation screen for receiving an operation by the user to the music player is displayed in third region R3.

Icon 224 is an icon indicating that, when focused by focus display 226 (that is, in a case of FIG. 4), operation screen 230 for receiving an operation by the user to the car navigation is displayed in third region R3.

Icon 225 is an icon indicating that, when focused by focus display 226, the operation screen for receiving an operation by the user to the air conditioner is displayed in third region R3.

Note that the above description has been made assuming that the first count is two and the second count is three. However, as long as the first count and the second count are both two or more and different from each other, the first count and the second count are not limited to the above combination. That is, the first count and the second count may be a combination of three and two, a combination of two and four, a combination of four and two, or the like. Of course, the first count and the second count may be a combination in which one of the first count and the second count is five.

Operation screen 230 is displayed in third region R3. Operation screen 230 in FIG. 4 is a screen for receiving an operation by the user to the car navigation. Note that as described above, either the operation screen or the operation guide screen corresponding to the type of gesture input into first touch sensor 11 is displayed in third region R3.

Returning to the description of controller 16 in FIG. 3, active processing for active display of first gesture guide 210 and second gesture guide 220 will be described.

When the touch input that is input into first touch sensor 11 is a touch with a plurality of fingers, controller 16 may highlight first gesture guide 210 or second gesture guide 220 in display 31.

Figure 5:
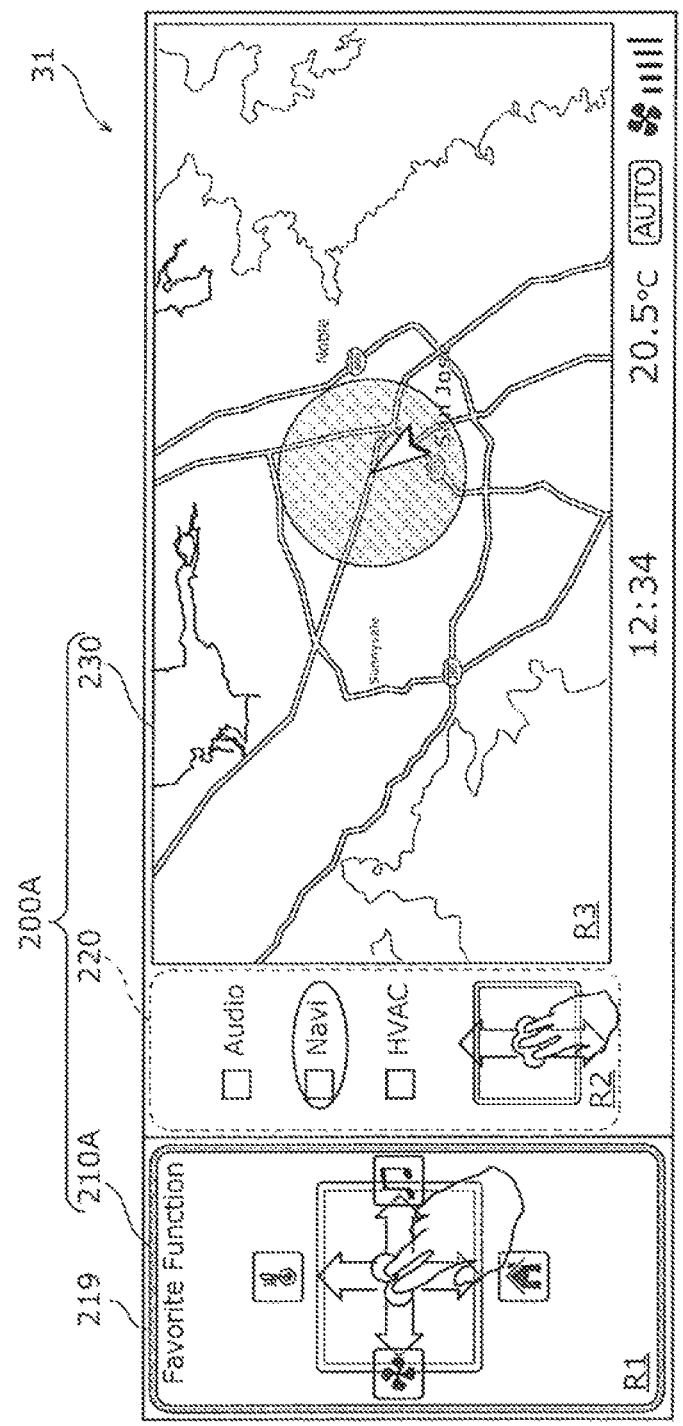
FIG. 5 is a view showing an example of a screen including a highlighted gesture guide.

Specifically, when the touch input that is input into first touch sensor 11 is a touch with two fingers, controller 16 selects first region R1 corresponding to the touch with two fingers. At this time, as shown in FIG. 5, controller 16 may cause display 31 to display screen 200A including first gesture guide 210A highlighted by displaying frame 219 along an outer periphery of selected first region R1. This makes it possible to indicate to the user that the gesture indicated by first gesture guide 210A is active, and to allow the user to recognize the operation guide screen to be displayed in third region R3 by the gesture that is input thereafter.

Figure 6:
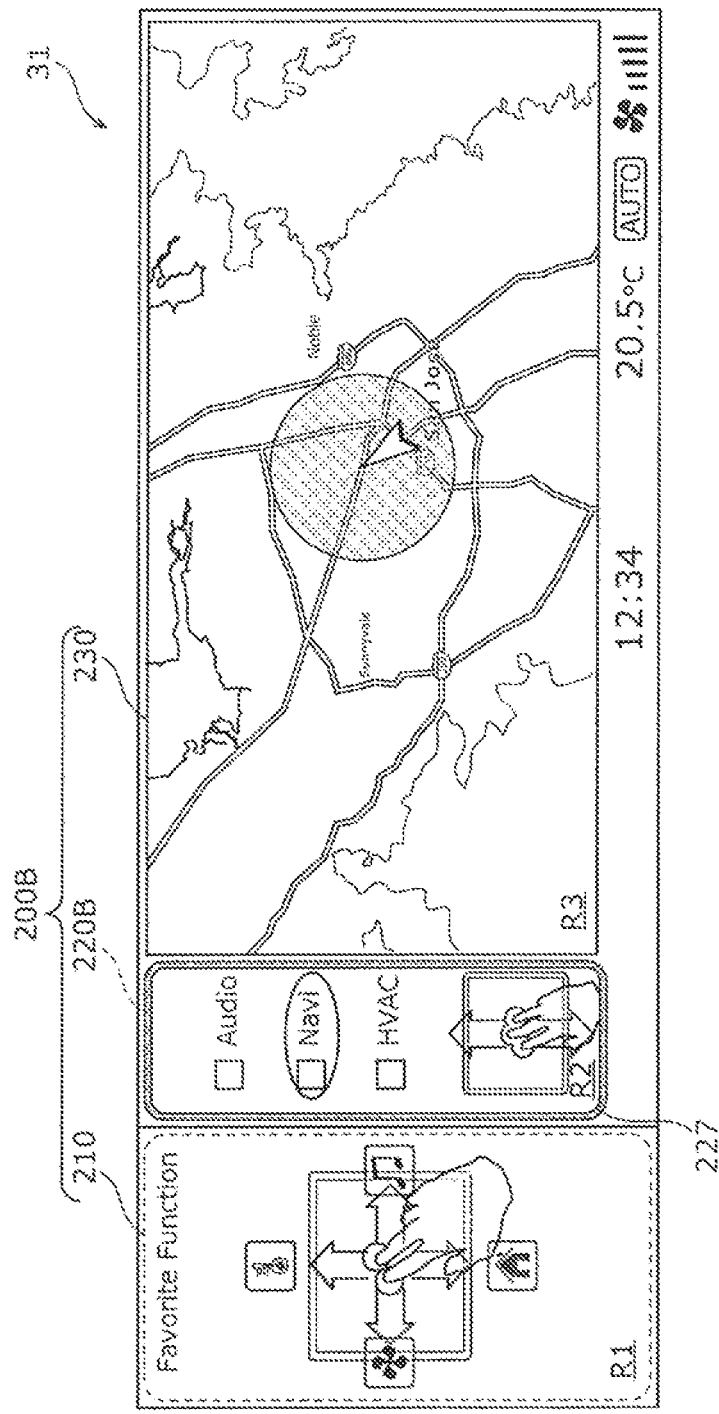
FIG. 6 is a view showing another example of the screen including the highlighted gesture guide.

Also, when the touch input that is input into first touch sensor 11 is a touch with three fingers, controller 16 selects second region R2 corresponding to the touch with three fingers. At this time, as shown in FIG. 6, controller 16 may cause display 31 to display screen 200B including second gesture guide 220B highlighted by displaying frame 227 along an outer periphery of selected second region R2. This makes it possible to indicate to the user that the gesture indicated by second gesture guide 220B is active, and to allow the user to recognize the operation screen to be displayed in third region R3 by the gesture that is input thereafter.

Note that when the touch that is input into first touch sensor 11 with a plurality of fingers is not performed (that is, the touch input is turned off), controller 16 may restore, after a predetermined time elapses, first gesture guide 210A or second gesture guide 220B that has been highlighted to an original state. That is, in this case, controller 16 deactivates first gesture guide 210A or second gesture guide 220B that has been activated, and displays first gesture guide 210 or second gesture guide 220, respectively.

Next, processing of controller 16 when the gesture input is performed into first touch sensor 11 with the first count (two in the present exemplary embodiment) of fingers will be described.

When the count of fingers of the gesture input that is input into first touch sensor 11 is the first count, controller 16 may cause display 31 to display an operation guide screen indicating an operation for adjusting the setting to vehicle-mounted device 30 included in automobile 1 as the second display screen. Specifically, controller 16 may cause display 31 to display, as the operation guide screen, a screen indicating the setting to vehicle-mounted device 30 adjusted by operating dial switch 12. Controller 16 may switch to the operation guide screen of the type corresponding to the type of gesture of the gesture input that is input into first touch sensor 11 and switch the type of setting to be adjusted by operating dial switch 12.

Specific examples of the gesture input with two fingers and the operation guide screens that are switched by the gesture input will be described with reference to FIGS. 7 to 11.

Figure 7:
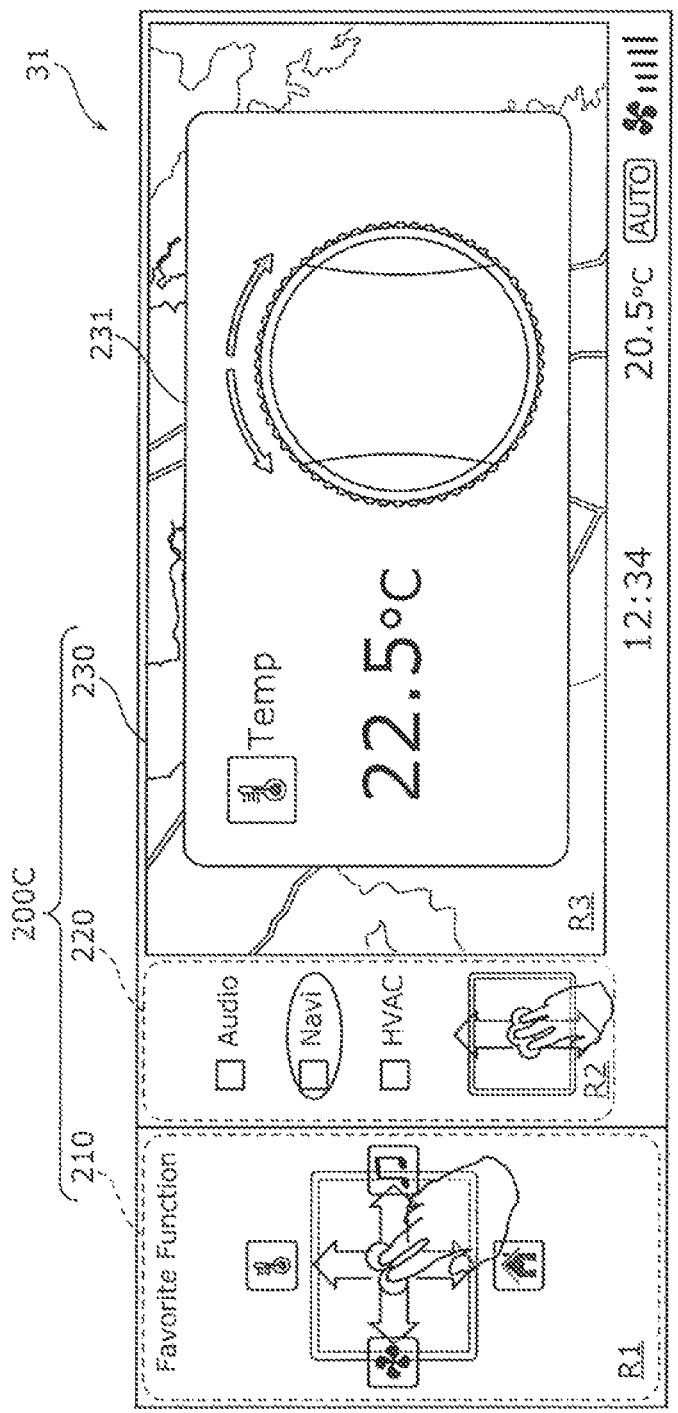
FIG. 7 is a view showing an example of an operation guide screen for adjusting heating and cooling temperature setting.
Figure 8:
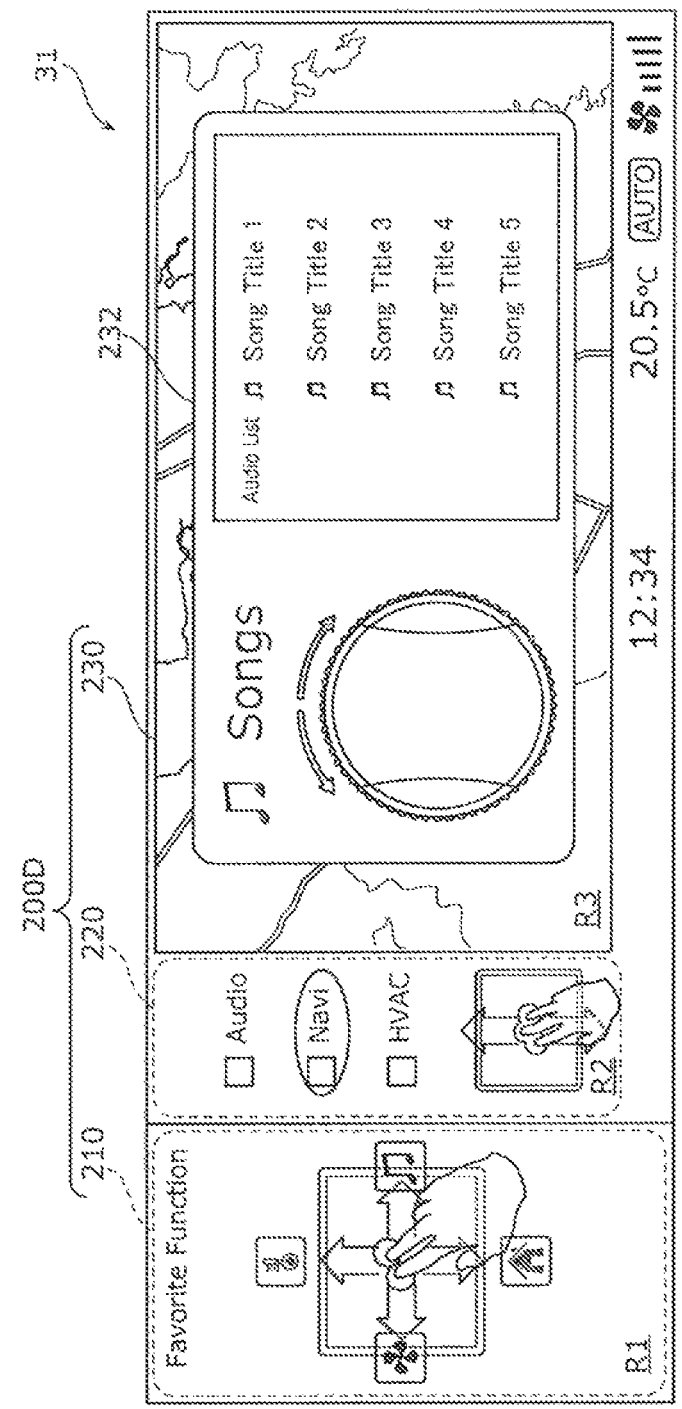
FIG. 8 is a view showing an example of an operation guide screen for selecting a song title of a music player.
Figure 9:
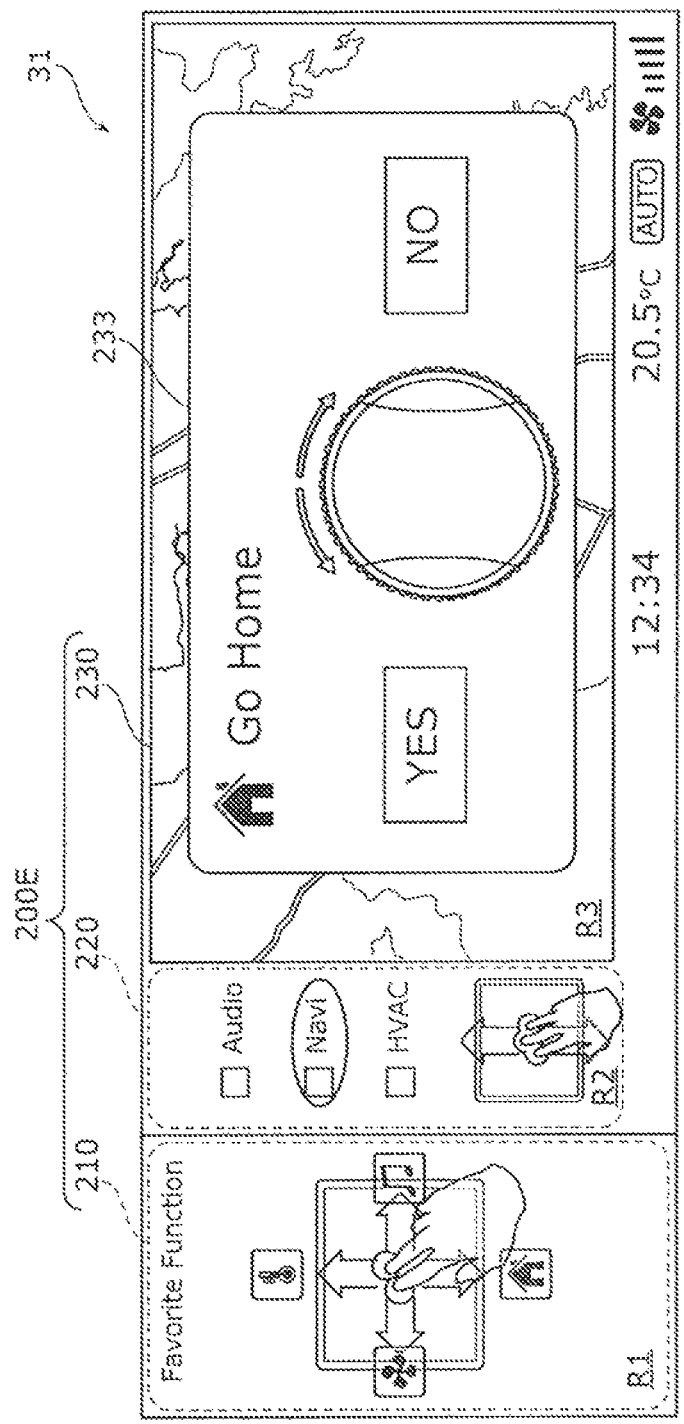
FIG. 9 is a view showing an example of an operation guide screen for setting going home in car navigation.
Figure 10:
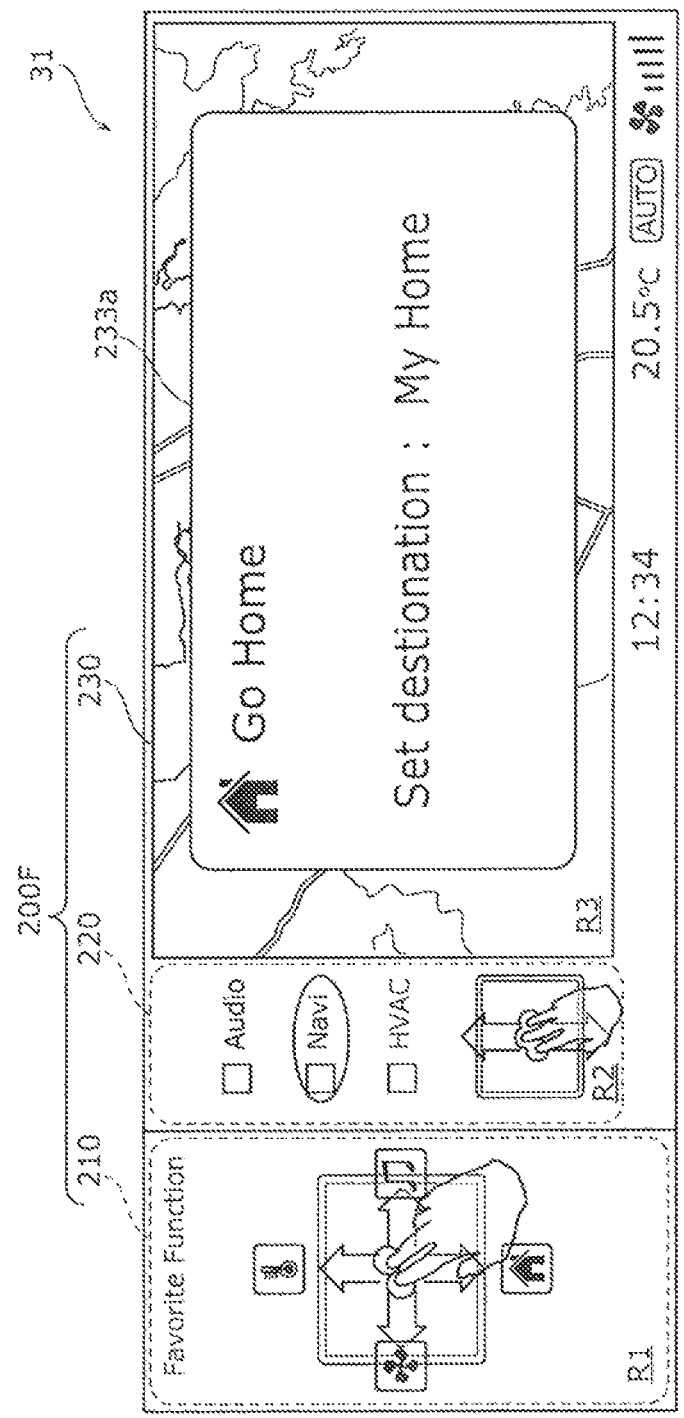
FIG. 10 is a view showing an example of a status screen in the car navigation.
Figure 11:
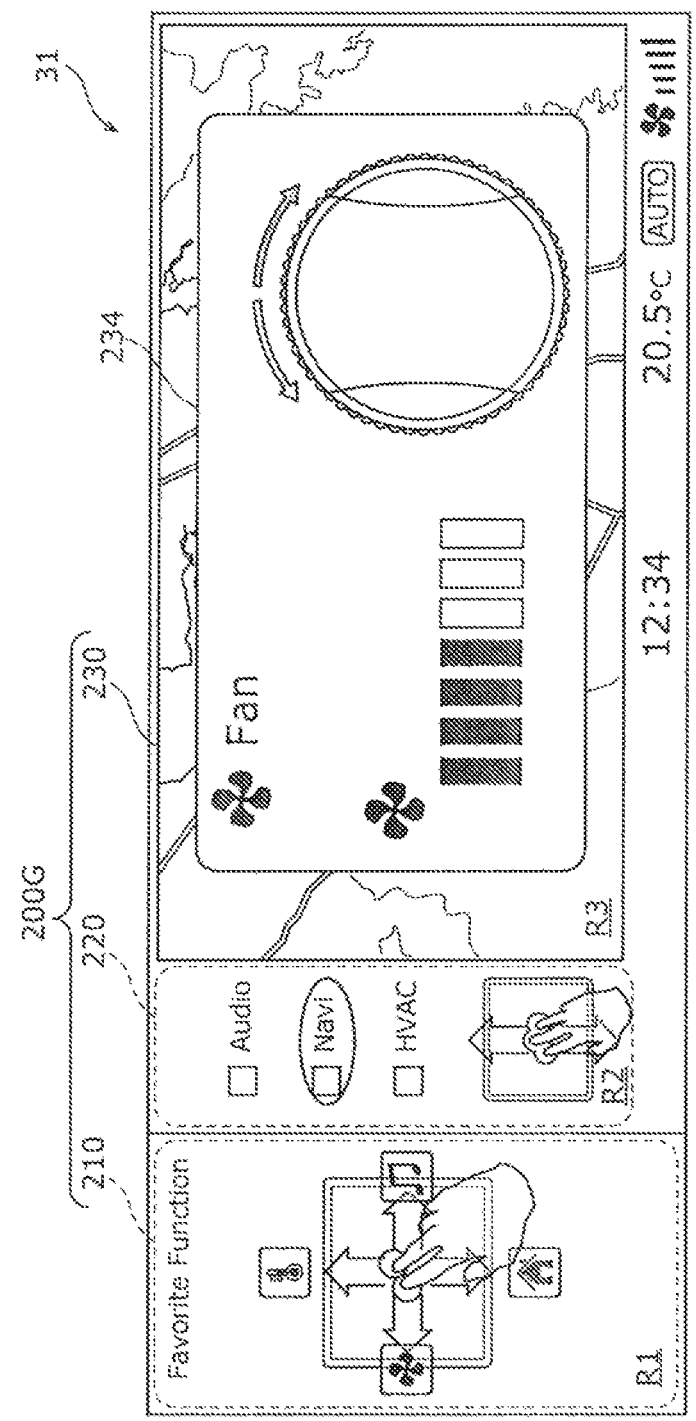
FIG. 11 is a view showing an example of an operation guide screen for adjusting air volume setting of an air conditioner.

FIG. 7 is a view showing an example of the operation guide screen for adjusting the heating and cooling temperature setting. FIG. 8 is a view showing an example of the operation guide screen for selecting a song title of the music player. FIG. 9 is a view showing an example of the operation guide screen for setting going home in the car navigation. FIG. 10 is a view showing an example of a status screen in the car navigation. FIG. 11 is a view showing an example of the operation guide screen for adjusting air volume setting of the air conditioner.

When gesture 211 to 214 with two fingers is input into first touch sensor 11, controller 16 displays first operation guide screen 231 to fourth operation guide screen 234, respectively, through superimposition on operation screen 230 displayed in third region R3 of display 31. Note that in this case, controller 16 does not need to display first operation guide screen 231 to fourth operation guide screen 234 through superimposition on operation screen 230, and controller 16 may display first operation guide screen 231 to fourth operation guide screen 234 instead of operation screen 230. That is, when the touch input into first touch sensor 11 is the gesture input with two fingers, controller 16 performs switching processing to switch from display screen 200 displayed on display 31 to display screens 200C to 200G and causes display 31 to display screens 200C to 200G. Note that in the following description, processing to call first operation guide screen 231 to fourth operation guide screen 234 by performing superimposition display is also defined as the switching processing.

Also, when controller 16 receives the input tracing first touch sensor 11 in a predetermined direction out of the gesture input with the first count of fingers, controller 16 may switch to the operation guide screen of a type corresponding to the predetermined direction indicated by the received gesture input and change the type of setting to be adjusted by operating dial switch 12.

Specifically, when the input is performed to trace first touch sensor 11 with two fingers in a forward direction, as shown in FIG. 7, controller 16 causes display 31 to display first operation guide screen 231. Also, when the input is performed to trace first touch sensor 11 with two fingers in a rightward direction, as shown in FIG. 8, controller 16 causes display 31 to display second operation guide screen 232. Also, when the input is performed to trace first touch sensor 11 with two fingers in a rearward direction, as shown in FIG. 9, controller 16 causes display 31 to display third operation guide screen 233. Also, when the input is performed to trace first touch sensor 11 with two fingers in a leftward direction, as shown in FIG. 11, controller 16 causes display 31 to display fourth operation guide screen 234.

As shown in FIG. 7, first operation guide screen 231 is an operation guide screen for adjusting the heating and cooling temperature setting of the air conditioner that performs heating, cooling, and ventilation of automobile 1.

When the user turns dial switch 12 in a leftward direction while first operation guide screen 231 is displayed on display 31, controller 16 decreases the heating and cooling temperature setting, for example, by 0.5 degrees every time dial switch 12 is rotated by a predetermined angle. Conversely, when the user turns dial switch 12 in a rightward direction, controller 16 increases the heating and cooling temperature setting, for example, by 0.5 degrees every time dial switch 12 is rotated by a predetermined angle. That is, controller 16 adjusts the heating and cooling temperature setting according to a rotation direction and rotation angle of a rotation input into dial switch 12.

As shown in FIG. 8, second operation guide screen 232 is an operation guide screen for selecting a song title of the music player.

When the user turns dial switch 12 in a leftward direction while second operation guide screen 232 is displayed on display 31, every time dial switch 12 is rotated by a predetermined angle, controller 16 sequentially selects a song title before the currently played back title from among a plurality of listed titles. Conversely, when the user turns dial switch 12 in a rightward direction, every time dial switch 12 is rotated by a predetermined angle, controller 16 sequentially selects a song title next to the currently played back title from among the plurality of listed titles. That is, controller 16 adjusts the song title selection according to the rotation direction and rotation angle of the rotation input into dial switch 12.

As shown in FIG. 9, third operation guide screen 233 is an operation guide screen for setting going home in the car navigation.

When the user turns dial switch 12 in a leftward direction while third operation guide screen 233 is displayed on display 31, controller 16 sets a home address of the user as a car navigation destination. Thereafter, controller 16 causes display 31 to display status screen 233a shown in FIG. 10, causes status screen 233a to fade out after a certain time elapses, and causes display 31 to display operation screen 230. Conversely, when the user turns dial switch 12 in a rightward direction, controller 16 causes third operation guide screen 233 to fade out, and causes display 31 to display operation screen 230.

As shown in FIG. 11, fourth operation guide screen 234 is an operation guide screen for adjusting the air volume setting of the air conditioner of automobile 1.

When the user turns dial switch 12 in a leftward direction while fourth operation guide screen 234 is displayed on display 31, every time dial switch 12 is rotated by a predetermined angle, controller 16 decreases the air volume of the air conditioner, for example, by one scale. Conversely, when the user turns dial switch 12 in a rightward direction, every time dial switch 12 is rotated by a predetermined angle, controller 16 increases the air volume of the air conditioner, for example, by one scale. That is, controller 16 adjusts the air volume setting of the air conditioner according to the rotation direction and rotation angle of the rotation input into dial switch 12.

Next, processing of controller 16 when the gesture input is performed into first touch sensor 11 with the second count (three in the present exemplary embodiment) of fingers different from the first count will be described.

When the count of fingers of the gesture input that is input into first touch sensor 11 is the second count (for example, three) different from the first count, controller 16 may cause display 31 to display, as the second display screen, an operation screen for receiving an operation to vehicle-mounted device 30 by the user. Controller 16 receives an input tracing first touch sensor 11 in a predetermined direction or in the opposite direction out of the gesture input with the second count of (for example, three) fingers. Then, when the received gesture input is the predetermined direction, controller 16 may switch the plurality of types of operation screens in preset order. Alternatively, when the received gesture input is the opposite direction of the predetermined direction, controller 16 may switch the plurality of types of operation screens in opposite order of the preset order.

Figure 12:
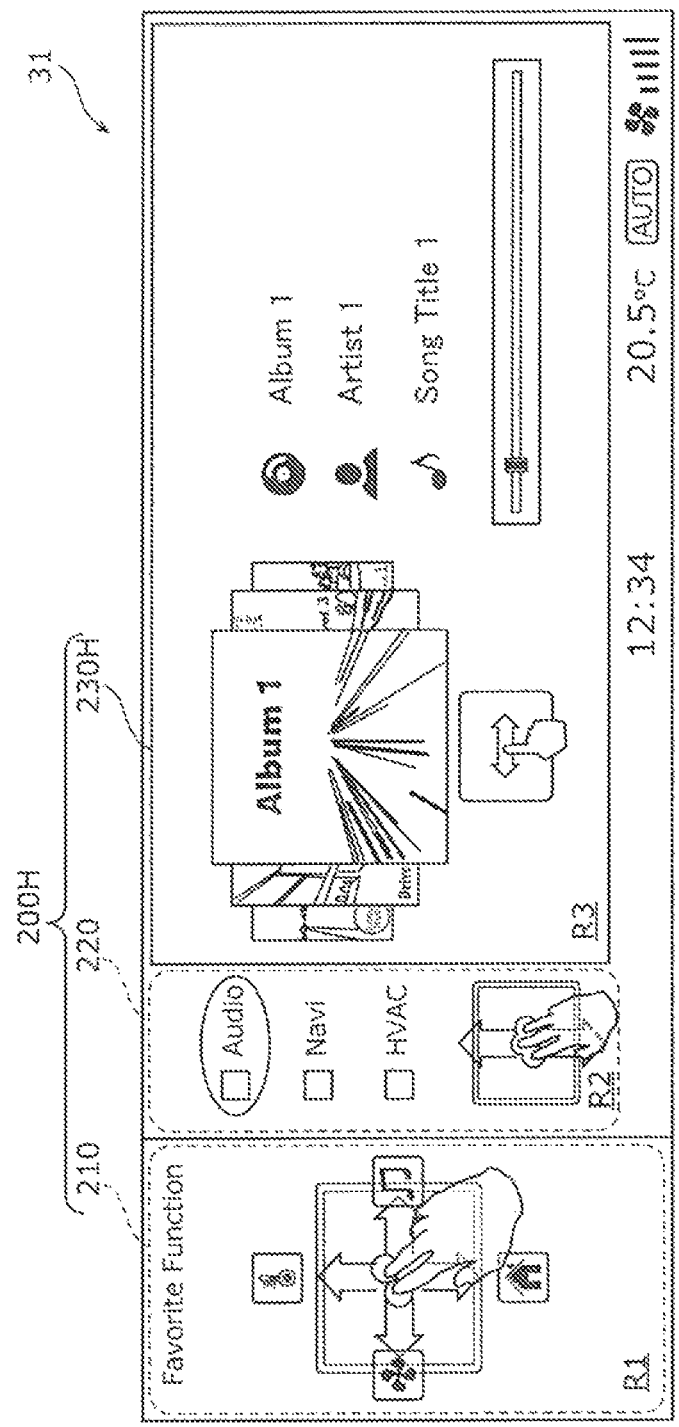
FIG. 12 is a view showing an example of an operation screen for operating the music player.
Figure 13:
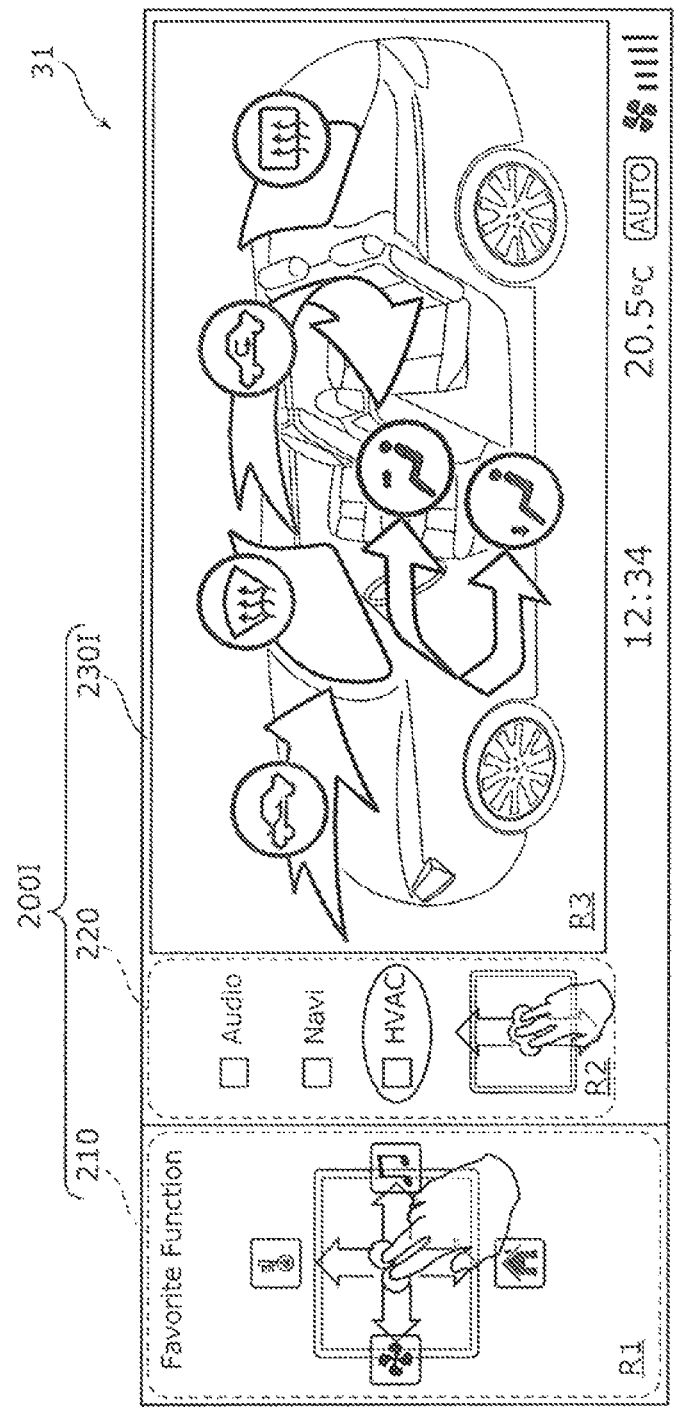
FIG. 13 is a view showing an example of an operation screen for operating the air conditioner.

Specific examples of the gesture input with three fingers and the operation screen that is switched when the gesture input is performed will be described with reference to FIGS. 4, 12, and 13. FIG. 12 is a view showing an example of the operation screen for operating the music player. FIG. 13 is a view showing an example of the operation screen for operating the air conditioner.

In a state of FIG. 4, when gesture 221 with three fingers in the predetermined direction (forward direction) is input into first touch sensor 11, controller 16 moves focus display 226 to icon 223 disposed on an upper direction side corresponding to the predetermined direction of currently focused icon 224, and controller 16 causes display 31 to display operation screen 230H (see FIG. 12) corresponding to icon 223 to which focus display 226 has moved. Alternatively, in the state of FIG. 4, when gesture 222 with three fingers in the opposite direction of the predetermined direction (rearward direction) is input into first touch sensor 11, controller 16 moves focus display 226 to icon 225 disposed on a lower direction side corresponding to the opposite direction of currently focused icon 224, and controller 16 causes display 31 to display operation screen 230I (see FIG. 13) corresponding to icon 225 to which focus display 226 has moved.

In the above case, by causing display 31 to display next operation screen 230H or operation screen 230I instead of operation screen 230 displayed in the third region of display 31, controller 16 performs switching processing to switch from display screen 200 displayed on display 31 to display screen 200H or 200I and to cause display 31 to display screen 200H or 200I. Note that when gesture 221 with three fingers in a direction from another icon toward icon 224 is input into first touch sensor 11, controller 16 moves focus display 226 from the currently focused icon to icon 224 disposed on a direction side corresponding to the input direction, and controller 16 causes display 31 to display operation screen 230 (see FIG. 4) corresponding to icon 224.

Operation screen 230 is an operation screen for operating the car navigation as shown in FIG. 4. When the user performs a gesture of tracing first touch sensor 11 with one finger while operation screen 230 is displayed in third region R3 of display 31, controller 16 selects third region R3 corresponding to the count of fingers being one from among three regions, first region R1 to third region R3, and for example, controller 16 scrolls and displays a map displayed on display 31 in a direction of the gesture that is input by the user.

Operation screen 230H is an operation screen for operating the music player as shown in FIG. 12. When the user performs a gesture of tracing first touch sensor 11 with one finger in a left-right direction while operation screen 230H is displayed in third region R3 of display 31, controller 16 selects third region R3 corresponding to the count of fingers being one from among three regions, first region R1 to third region R3, and for example, controller 16 performs switching in album units or play list units in which a plurality of titles is a set.

Operation screen 230J is an operation screen for operating the air conditioner as shown in FIG. 13. When the user turns dial switch 12 while operation screen 230I is displayed on display 31, controller 16 focuses, for example, one of the plurality of icons on operation screen 230I according to the rotation direction and the rotation angle, and performs display that enables selection of the focused icon.

Figure 14:
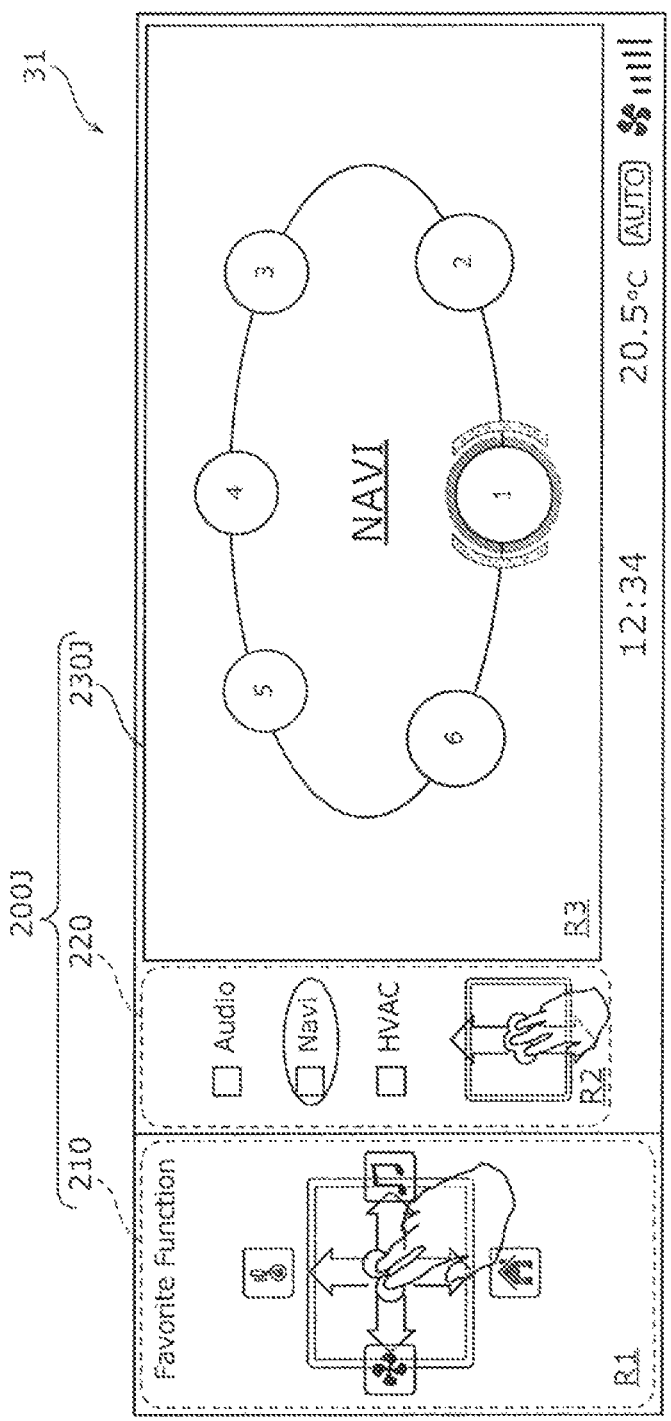
FIG. 14 is a view showing an example of a home screen.

In addition, when a predetermined input for causing display 31 to display home screen 230J is performed into first input unit 10, controller 16 may cause display 31 to display screen 200J including home screen 230J as shown in FIG. 14. When the user turns dial switch 12 while home screen 230J is displayed on display 31, controller 16 may switch to each of operation screens 230, 230H, 230I assigned to each icon indicated by 1 to 6 on home screen 230J, such as "music player", "air conditioner", and "car navigation."

Note that controller 16 may be implemented by, for example, a processor that executes a predetermined program and a memory that stores the predetermined program, or may be implemented by a dedicated circuit. Controller 16 may be implemented by, for example, an electronic control unit (ECU).

[1-3. Operation]

Next, an operation of input device 100 will be described with reference to FIGS. 15 to 20.

First, the active processing will be described with reference to FIGS. 15 and 16.

Figure 15:
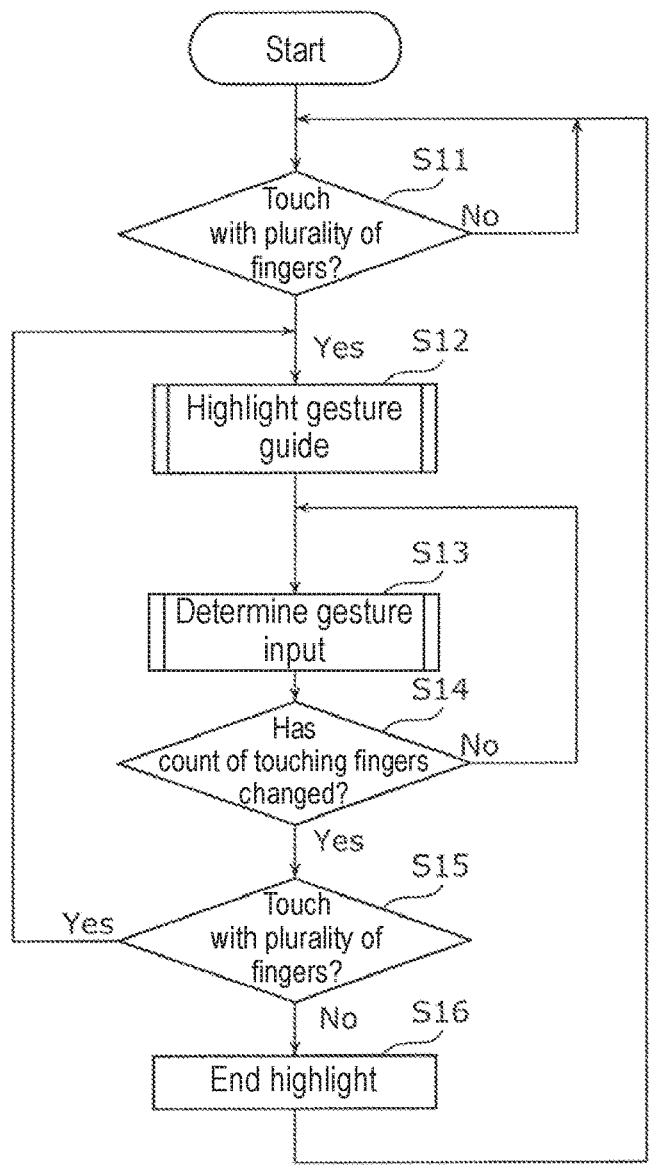
FIG. 15 is a flowchart showing active processing in the input device according to the exemplary embodiment.
Figure 16:
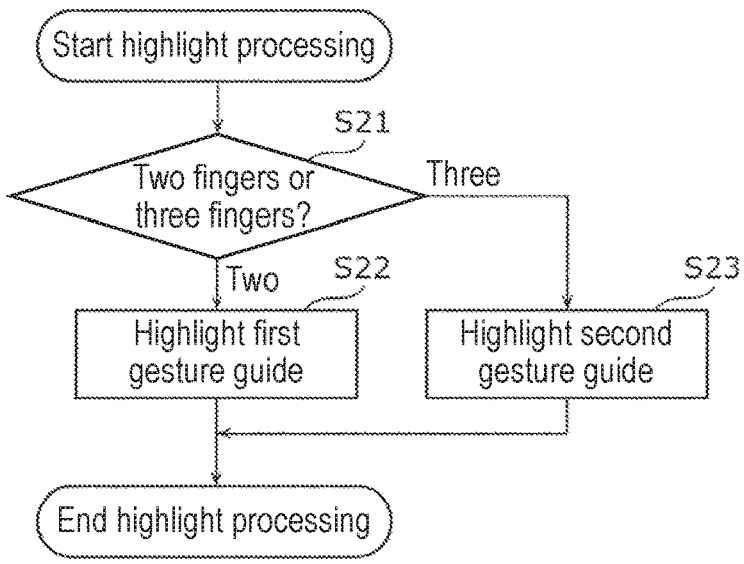
FIG. 16 is a flowchart showing highlight processing in the input device according to the exemplary embodiment.

FIG. 15 is a flowchart showing the active processing in the input device according to the exemplary embodiment. FIG. 16 is a flowchart showing highlight processing in the input device according to the exemplary embodiment.

Controller 16 determines whether first touch sensor 11 is touched with a plurality of fingers (S11).

On determination that first touch sensor 11 is touched with the plurality of fingers (Yes in S11), controller 16 selects first region R1 or second region R2 corresponding to the count of fingers, and performs the highlight processing of first gesture guide 210 or second gesture guide 220 (S12).

On determination that first touch sensor 11 is not touched with the plurality of fingers (No in S11), controller 16 repeats step S11. That is, controller 16 waits until first touch sensor 11 is touched with the plurality of fingers. Note that processing of selecting third region R3 based on the touch with one finger is executed by a flowchart (not shown) different from the flowchart of FIG. 15.

Next, controller 16 determines the gesture input performed with the fingers touching first touch sensor 11 (S13). Then, controller 16 determines whether the count of fingers touching first touch sensor 11 has changed (S14).

On determination that the count of fingers touching first touch sensor 11 has changed (Yes in S14), controller 16 determines whether first touch sensor 11 is touched with the plurality of fingers (S15). On the other hand, on determination that the count of fingers touching first touch sensor 11 has not changed (No in S14), controller 16 returns to step S13 and repeats the processing in and after step S13. That is, controller 16 repeats the determination of gesture input until the count of fingers touching first touch sensor 11 changes.

On determination that first touch sensor 11 is not touched with the plurality of fingers (No in S15), controller 16 ends the gesture guide highlighted in step S12 (S16) and returns the highlight to an original state.

On determination that first touch sensor 11 is touched with the plurality of fingers (Yes in S15), controller 16 returns to step S12.

Here, details of the highlight processing of step S12 will be described with reference to FIG. 16.

Controller 16 determines whether the count of fingers touching first touch sensor 11 is two or three (S21).

On determination that the count of fingers touching first touch sensor 11 is two (two in S21), controller 16 causes display 31 to display first gesture guide 210A highlighted as shown in FIG. 5 (S22).

On the other hand, on determination that the count of fingers touching first touch sensor 11 is three (three in S21), controller 16 causes display 31 to display second gesture guide 220B highlighted as shown in FIG. 6 (S23).

Next, gesture input determination processing and the switching processing will be described.

Figure 17:
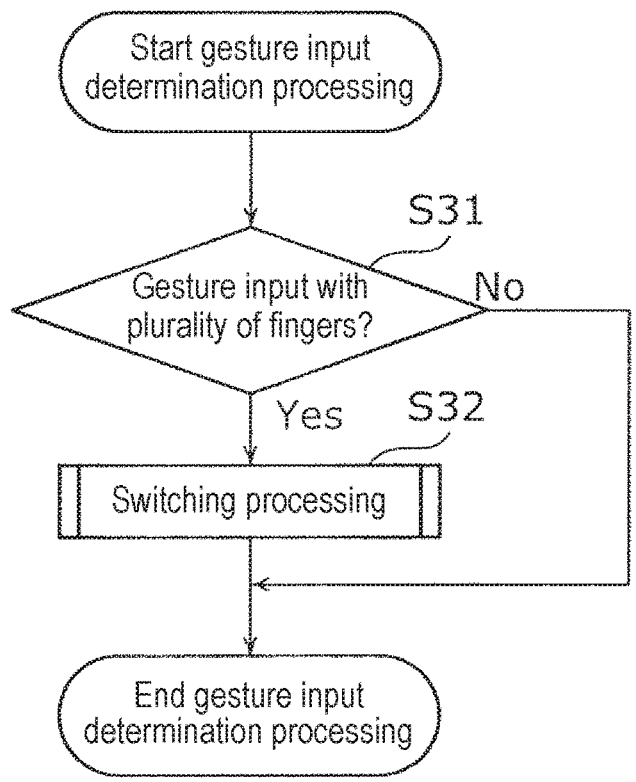
FIG. 17 is a flowchart showing gesture input determination processing in the input device according to the exemplary embodiment.

FIG. 17 is a flowchart showing the gesture input determination processing in the input device according to the exemplary embodiment.

Controller 16 determines whether the gesture input with a plurality of fingers has been performed into first touch sensor 11 (S31).

On determination that the gesture input with the plurality of fingers has been performed into first touch sensor 11 (Yes in S31), controller 16 performs the switching processing to switch from the first display screen displayed on display 31 and to cause display 31 to display the second display screen different from the first display screen (S32).

On determination that the gesture input with the plurality of fingers is not performed into first touch sensor 11 (No in S31), controller 16 ends the gesture input determination processing.

Here, details of the switching processing in step S32 will be described with reference to FIG. 18.

Figure 18:
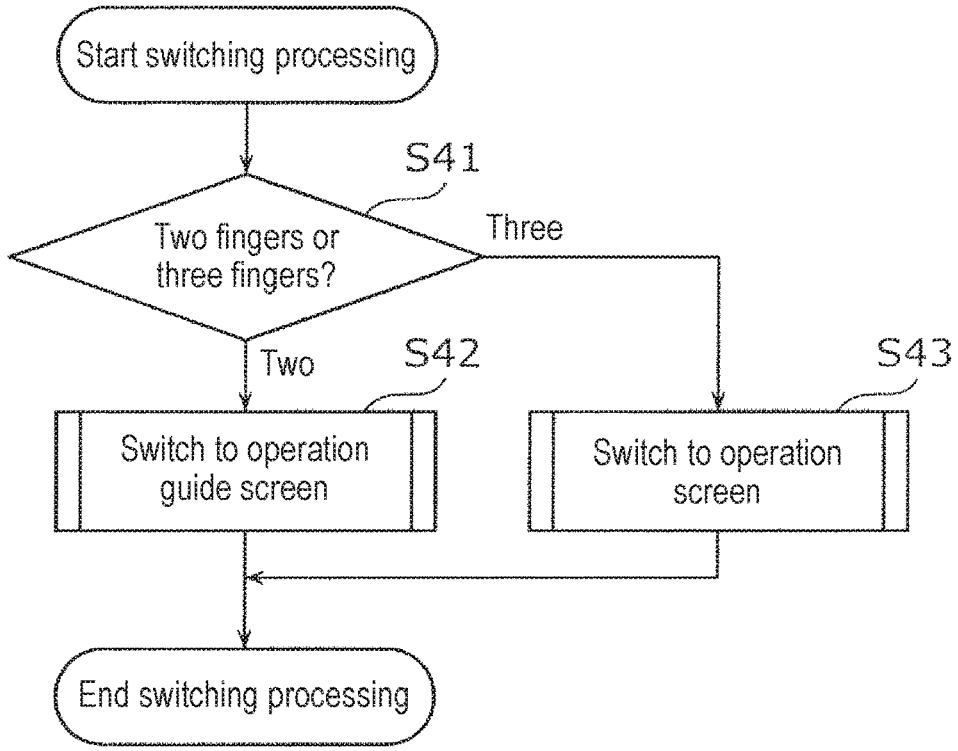
FIG. 18 is a flowchart showing switching processing in the input device according to the exemplary embodiment.

FIG. 18 is a flowchart showing the switching processing in the input device according to the exemplary embodiment.

Controller 16 determines whether the count of fingers of the gesture input into first touch sensor 11 is two or three (S41).

On determination that the count of fingers of the gesture input is two (two in S41), controller 16 performs processing to switch to one of first operation guide screen 231 to fourth operation guide screen 234 (S42).

On determination that the count of fingers of the gesture input is three (three in S41), controller 16 performs processing to switch to the operation screen (S43).

Next, details of the processing to switch to the operation guide screen in step S42 will be described with reference to FIG. 19.

Figure 19:
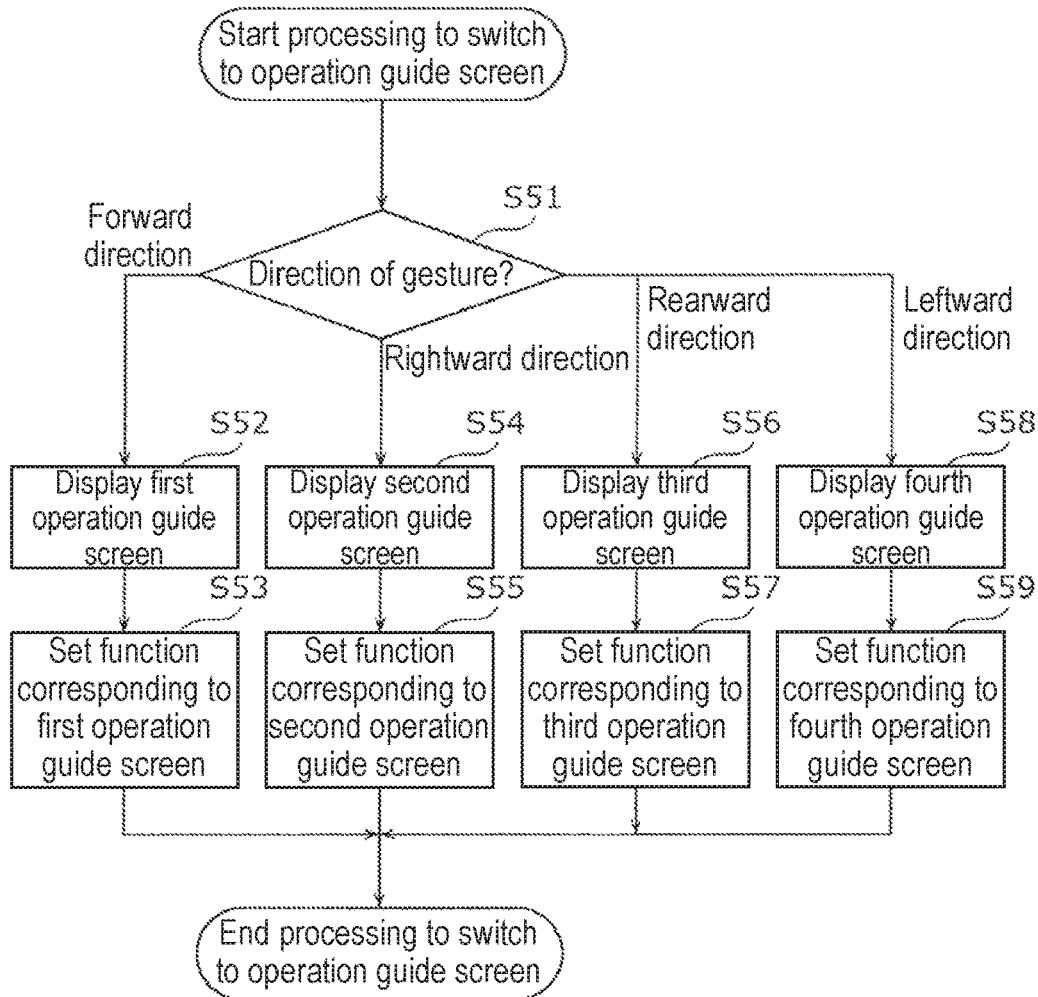
FIG. 19 is a flowchart showing details of processing to switch to the operation guide screen in the input device according to the exemplary embodiment.

FIG. 19 is a flowchart showing details of the processing to switch to the operation guide screen in the input device according to the exemplary embodiment.

Controller 16 determines the direction of the gesture of the gesture input (S51).

On determination that the direction of the gesture of the gesture input is a forward direction, controller 16 causes display 31 to display first operation guide screen 231 shown in FIG. 7 (S52), and controller 16 sets the function of dial switch 12 to a function for adjusting the heating and cooling temperature setting shown in first operation guide screen 231 (S53).

On determination that the direction of the gesture of the gesture input is a rightward direction, controller 16 causes display 31 to display second operation guide screen 232 shown in FIG. 8 (S54), and controller 16 sets the function of dial switch 12 to a function for adjusting selection of a song title of the music player shown in second operation guide screen 232 (S55).

On determination that the direction of the gesture of the gesture input is a rearward direction, controller 16 causes display 31 to display third operation guide screen 233 shown in FIG. 9 (S56), and controller 16 sets the function of dial switch 12 to a function for setting going home in the car navigation shown in third operation guide screen 233 (S57).

On determination that the direction of the gesture of the gesture input is a leftward direction, controller 16 causes display 31 to display fourth operation guide screen 234 shown in FIG. 11 (S58), and controller 16 sets the function of dial switch 12 to a function for adjusting the air volume setting of the air conditioner shown in fourth operation guide screen 234 (S59).

Next, details of the processing to switch to the operation screen of step S43 will be described with reference to FIG. 20.

Figure 20:
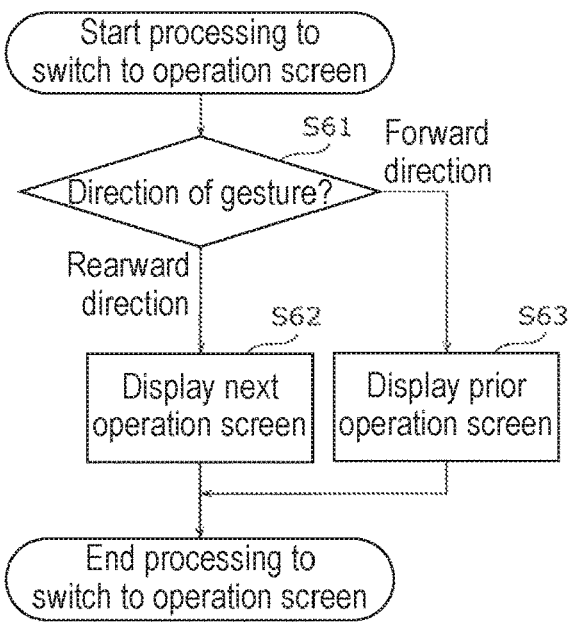
FIG. 20 is a flowchart showing details of processing to switch to the operation screen in the input device according to the exemplary embodiment.

FIG. 20 is a flowchart showing details of the processing to switch to the operation screen in the input device according to the exemplary embodiment.

Controller 16 determines whether the direction of the gesture of the gesture input is a forward direction or a rearward direction (S61).

On determination that the direction of the gesture of the gesture input is a rearward direction (rearward direction in S61), controller 16 causes display 31 to display the next operation screen of the currently displayed operation screen in predetermined order of the plurality of operation screens (that is, order indicated by arrangement of icons 223 to 225) (S62). For example, when operation screen 230 shown in FIG. 4 is displayed, controller 16 causes display 31 to display next operation screen 230I of operation screen 230 (FIG. 13).

On determination that the direction of the gesture of the gesture input is a forward direction (forward direction in S61), controller 16 causes display 31 to display the prior operation screen of the currently displayed operation screen in predetermined order of the plurality of operation screens (S63). For example, when operation screen 230 shown in FIG. 4 is displayed, controller 16 causes display 31 to display prior operation screen 230H of operation screen 230 (FIG. 12).

[1-4. Effects and the Like]

Input device 100 according to the present exemplary embodiment is input device 100 that performs input for operating the user interface (UI) to be displayed on display 31 disposed in automobile 1, and includes first touch sensor 11 and controller 16. First touch sensor 11 receives a touch input by the user. When the touch input into first touch sensor 11 is a touch with a plurality of fingers, controller 16 selects a region corresponding to the count of fingers from among the plurality of regions displayed on display 31. That is, since controller 16 selects the region corresponding to the count of fingers from among the plurality of regions constituting the display region of display 31, first region R1 to third region R3, controller 16 can accurately select the intended region without being conscious of positions of the fingers with respect to first touch sensor 11 while the user is driving.

Also, in input device 100, when the touch input into first touch sensor 11 is a gesture input with a plurality of fingers, controller 16 performs the switching processing to switch from the first display screen displayed on display 31 and to cause display 31 to display the second display screen different from the first display screen. That is, controller 16, which performs the switching processing by the gesture input using the plurality of fingers, can inhibit recognition of an unintended input.

Also, in input device 100, when the touch input that is input into first touch sensor 11 is a touch with a plurality of fingers, controller 16 causes display 31 to highlight first gesture guide 210 or second gesture guide 220 including a plurality of types of gestures 211 to 214, 221, 222, and icons 215 to 218, 223 to 225 respectively associated with the plurality of types of gestures 211 to 214, 221, 222. Icons 215 to 218, 223 to 225 are icons indicating the types of screen to be displayed next as the second display screen when the input of the corresponding type of gesture is performed.

This makes it possible to indicate to the user that first gesture guide 210 or second gesture guide 220 is active, and to allow the user to recognize the screen to be displayed on display 31 by the gesture to input thereafter before the screen is displayed. This allows the user to appropriately select the gesture input for displaying a desired screen, and to easily display the desired screen.

Also, in input device 100, the touch sensor includes first touch sensor 11 that is disposed at a position within a range where the user's hand almost reaches while the user aboard automobile 1 is seated on seat 60 of automobile 1, the position excluding steering wheel 50 of automobile 1. When the touch input into first touch sensor 11 is the gesture input, controller 16 performs the switching processing. This allows the user to easily perform the gesture input into first touch sensor 11.

Also, in input device 100, when the count of fingers of the gesture input that is input into first touch sensor 11 is the first count (for example, two), controller 16 causes display 31 to display first operation guide screen 231 to fourth operation guide screen 234 indicating the operation for adjusting the setting to vehicle-mounted device 30 included in automobile 1 as the second display screen. This makes it possible to cause display 31 to easily display first operation guide screen 231 to fourth operation guide screen 234.

In addition, input device 100 further includes dial switch 12 that is disposed adjacent to first touch sensor 11 and receives the dial input. Controller 16 causes display 31 to display, as first operation guide screen 231 to fourth operation guide screen 234, the screen indicating the setting to vehicle-mounted device 30 adjusted by operating dial switch 12. This makes it possible to cause display 31 to easily display first operation guide screen 231 to fourth operation guide screen 234 for dial switch 12.

Also, in input device 100, controller 16 switches between first operation guide screen 231 to fourth operation guide screen 234 of the type corresponding to the type of gesture of the gesture input that is input into first touch sensor 11, and switches the type of setting to be adjusted by operating dial switch 12. This makes it possible to easily switch the function of dial switch 12.

Also, in input device 100, when controller 16 receives the gesture input tracing first touch sensor 11 with the first count of (for example, two) fingers in the predetermined direction, controller 16 switches between first operation guide screen 231 to fourth operation guide screen 234 of the type corresponding to the predetermined direction indicated by the gesture input, and switches the type of setting to be adjusted by operating dial switch 12. This makes it possible to cause display 31 to easily display the desired operation guide screen among the plurality of operation guide screens, first operation guide screen 231 to fourth operation guide screen 234.

Also, in input device 100, when the count of fingers of the gesture input that is input into first touch sensor 11 is the second count (for example, three) different from the first count (for example, two), controller 16 causes display 31 to display, as the second display screen, operation screen 230, 230H, 230I for receiving the operation to the vehicle-mounted device by the user. This allows display 31 to easily display operation screen 230, 230H, 230I.

Also, in input device 100, when controller 16 receives the input tracing first touch sensor 11 in the predetermined direction or in the opposite direction out of the gesture input with the second count of (for example, three) fingers and the received gesture input is the predetermined direction, controller 16 switches the plurality of types of operation screens 230, 230H, 230I in preset order. Alternatively, when the received gesture input is the opposite direction, controller 16 switches the plurality of types of operation screens 230, 230H, 230I in order opposite to the order. This makes it possible to cause display 31 to easily display the desired operation screen among the plurality of operation screens 230, 230H, 230I.

[1-5. Modification]

In the above exemplary embodiment, first touch sensor 11 disposed at a position excluding steering wheel 50 of automobile 1 is used as the touch sensor. However, the present invention is not limited to this exemplary embodiment. For example, as shown in FIGS. 21 and 22, input device 100A including second input unit 20 including second touch sensor 21 disposed in steering wheel 50 of automobile 1A may be employed.

Figure 21:
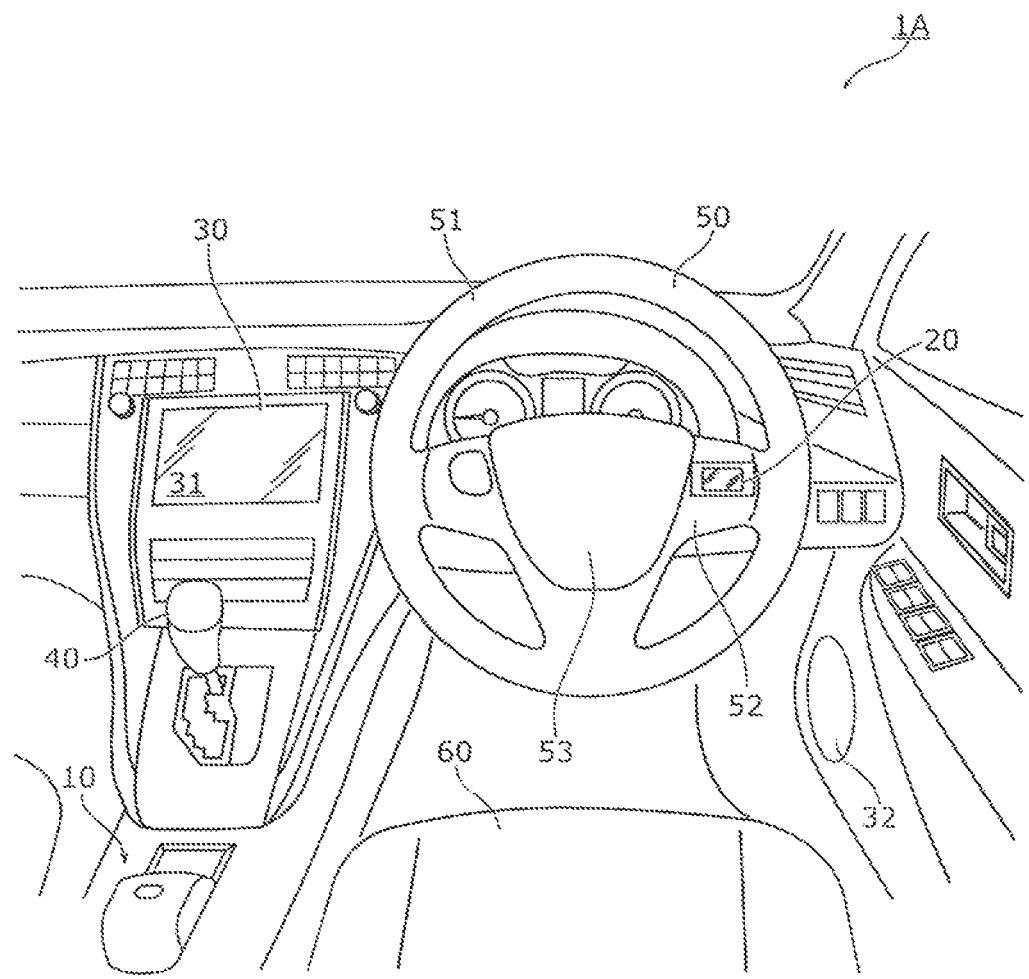
FIG. 21 is a view showing an example of a configuration of an input device and a cabin of a vehicle in which the input device is disposed according to a modification.
Figure 22:
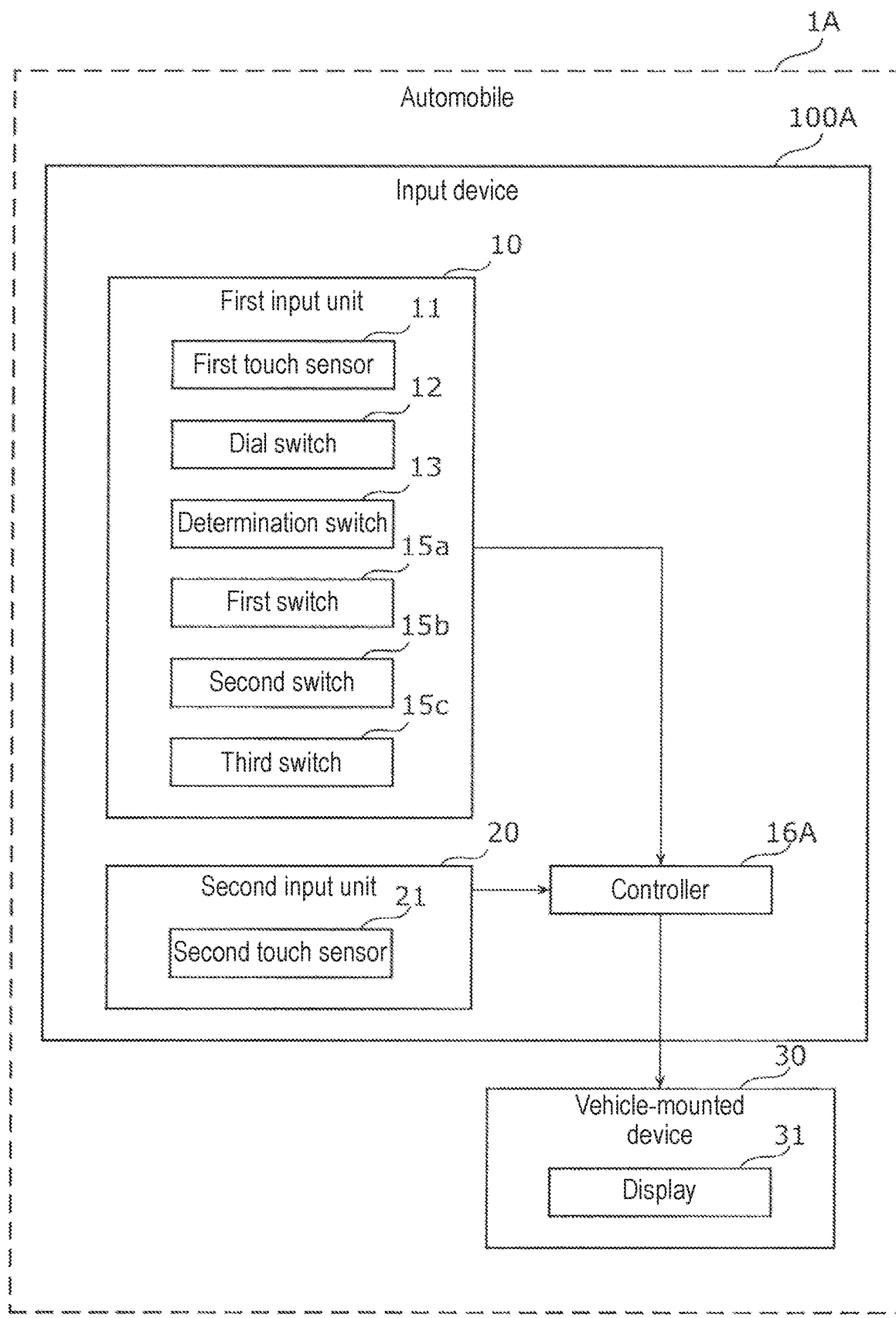
FIG. 22 is a block diagram showing an example of a functional configuration of the input device mounted in an automobile according to the modification.

FIG. 21 is a view showing an example of a configuration of an input device and a cabin of a vehicle in which the input device is disposed according to a modification. FIG. 22 is a block diagram showing an example of a functional configuration of the input device mounted in an automobile according to the modification.

Input device 100A according to the modification differs from input device 100 of the exemplary embodiment only in the configuration of second input unit 20 and the function of controller 16A. Therefore, descriptions of second input unit 20 will be performed, and descriptions of other configurations will be omitted.

Second input unit 20 is disposed in steering wheel 50. Second input unit 20 is a switch including second touch sensor 21. Second input unit 20 is disposed, for example, in spoke 52 of steering wheel 50.

A driver can operate vehicle-mounted device 30 by performing input into second input unit 20 with a right hand finger grasping rim 51 of steering wheel 50.

Second touch sensor 21 is a sensor that detects a position touched by part of a user's body (for example, a finger). When the input into second touch sensor 21 is performed, an input signal indicating the input is output to controller 16A.

When the touch input into second touch sensor 21 is a plurality of taps, controller 16A selects a region corresponding to the count of taps from among the plurality of regions constituting the display region of display 31, first region R1 to third region R3. Alternatively, when the touch input into second touch sensor 21 is the second gesture input after the plurality of taps, controller 16A performs switching processing to switch from the first display screen displayed on display 31 and to cause display 31 to display the second display screen different from the first display screen. Details of the selection processing and switching processing of the display region are similar to processing of the exemplary embodiment, and thus the description will be omitted.

When the touch input that is input into second touch sensor 21 is the plurality of taps, controller 16A may cause display 31 to highlight the gesture guide. For example, when the touch input that is input into second touch sensor 21 is two taps, controller 16A may cause display 31 to highlight the gesture guide indicating the gestures in four directions, like first gesture guide 210. Alternatively, for example, when the touch input that is input into second touch sensor 21 is three taps, controller 16A may cause display 31 to highlight the gesture guide indicating the gestures in two directions, like second gesture guide 220.

That is, for second touch sensor 21 disposed in steering wheel 50, instead of the touch input with a plurality of fingers, controller 16A receives a plurality of tap inputs as an input for display region selection processing. In this way, since the touch sensor disposed at a position where the touch input with a plurality of fingers is difficult recognizes a plurality of tap inputs as an input for the display region selection processing, the touch sensor allows accurate selection of the intended region. This makes it possible to inhibit recognition of an unintended input.

Note that the display screen accompanying the touch input into second touch sensor 21 is not limited to the configuration displayed on display 31, but may be displayed, for example, on a display provided in a meter. In this case, a result of operating second touch sensor 21 while the driver is driving can be visually recognized with minimum eye movement. Alternatively, a result of operating first touch sensor 11 may be displayed on the display in the meter.

In addition, the configuration shown in FIGS. 21 and 22 includes both first input unit 10 and second input unit 20, but the configuration may include only second input unit 20.

[1-6. Other Exemplary Embodiments]

According to the above-described exemplary embodiment and modification, the configurations of input devices 100, 100A do not include display 31, but the configurations may include display 31.

Types of the gesture in the above-described exemplary embodiment may be not only a one-way gesture but also an L shape, reciprocation, a circle, a character, or the like.

Note that in each of the above exemplary embodiments, each constituent element may be implemented by dedicated hardware or by execution of software programs suitable for each constituent element. Each constituent element may be implemented in such a manner that a program execution section such as a central processing unit (CPU) or a processor reads and executes software programs recorded in a recording medium such as a hard disk or a semiconductor memory. Here, the software that implements the input device and the like of each exemplary embodiment is the following program.

That is, this program is an input method by the input device that performs input for operating the user interface (UI) displayed by the display disposed in the vehicle. The program determines whether the touch input by the user into the touch sensor provided in the input device is a touch with a plurality of fingers or a plurality of taps. On determination that the touch input is a touch with the plurality of fingers or the plurality of taps, the program executes the input method of selecting the region corresponding to the count of fingers or the count of taps from among the plurality of regions constituting the display region of the display.

As described above, the input device and the input method according to one or more aspects of the present invention have been described based on the exemplary embodiment; however, the present invention is not limited to the exemplary embodiment. Configurations in which various modifications conceived by those skilled in the art are applied to the present exemplary embodiment, and configurations established by combining constituent elements in different exemplary embodiments may also fall within the scope of one or more aspects of the present invention, without departing from the spirit of the present invention.

INDUSTRIAL APPLICABILITY

The present invention is useful as the input device that can inhibit recognition of the unintended input into the UI displayed on the display even when the user is doing other work.

REFERENCE MARKS IN THE DRAWINGS 1, 1A: automobile
10: first input unit
11: first touch sensor
12: dial switch
13: determination switch
14: palm rest
15a: first switch
15b: second switch
15c: third switch
16, 16A: controller
20: second input unit
21: second touch sensor
30: vehicle-mounted device
31: display
32: speaker
40: shift lever
50: steering wheel
51: rim
52: spoke
53: horn switch cover
60: seat
100, 100A: input device
200, 200A to 200J: display screen
210, 210A: first gesture guide
211, 212, 213, 214: gesture
215 to 218: icon
219: frame
220, 220B: second gesture guide
221, 222: gesture
223 to 225: icon
226: focus display
227: frame
230, 230H, 230I: operation screen
230J: home screen
231: first operation guide screen
232: second operation guide screen
233: third operation guide screen
233a: status screen
234: fourth operation guide screen
R1: first region
R2: second region
R3: third region

The invention claimed is:

1. An input device for a vehicle, the input device performing input for operating a user interface (UI) displayed by a display disposed in the vehicle, the input device comprising:
 a touch sensor that receives a touch input performed with at least one of fingers of a user;
 a controller selects, when the touch input into the touch sensor is a touch in which at least two of the fingers is in contact with the touch sensor simultaneously, a region corresponding to a count of the contacts of the touch from a plurality of regions constituting a display region of the display, the controller selecting, when the touch input into the touch sensor is a tap in which at least one of the fingers repeats a contact with the touch sensor within a predetermined time, a region corresponding to a count of the contacts of the tap from the plurality of regions constituting the display region of the display,
 the touch sensor includes the first touch sensor, the first touch sensor being disposed at a position within a range where a hand of the user almost reaches while the user aboard the vehicle is seated on a seat of the vehicle, the position excluding a steering wheel of the vehicle; and
 a dial switch that is disposed adjacent to a first touch sensor and receives dial input, wherein
 when the touch input into the touch sensor is a first gesture input by one of the touch and a second gesture input after the tap, the controller performs switching processing to switch from a first display screen displayed by the display to a second display screen different from the first display screen and to cause the display to perform display,
 when the count of contacts of the touch of the first gesture input that is input into the first touch sensor is the count of contacts of a first touch, the controller causes the display to display as the second display screen an operation guide screen indicating an operation for adjusting a setting to a vehicle-mounted device included in the vehicle when the dial switch is operated, and
 the controller switches a type of the operation indicated on the operation guide screen according to a type of the gesture of the first gesture input that is input into the first touch sensor, and the controller switches a type of the setting adjusted by operating the dial switch.

2. The input device for the vehicle according to claim 1, wherein
 when the touch input that is input into the touch sensor is the touch or the tap, after the touch input is performed, the controller displays a gesture guide associating a type of gesture that is input into the touch sensor with an icon indicating a screen to be displayed according to the type of gesture in the selected region of the display.

3. The input device for the vehicle according to claim 1, wherein
 the controller receives an input tracing the touch sensor in a predetermined direction out of the first gesture input by the touch of the count of contacts of the first touch, and
 according to the predetermined direction indicated by the received first gesture input, the controller switches the type of the operation indicated on the operation guide screen, and switches the type of the setting adjusted by operating the dial switch.

4. An input device for a vehicle for performing input for operating a user interface (UI) displayed by a display disposed in the vehicle, the input device comprising:
a touch sensor that receives a touch input performed with a finger of a user; and
a controller that selects, when the touch input into the touch sensor is a touch in which a plurality of the fingers is in contact with the touch sensor simultaneously, a region corresponding to a count of contacts of the touch from among a plurality of regions constituting a display region of the display, the controller selecting, when a tap in which at least one finger repeats a plurality of contacts with the touch sensor within a predetermined time, a region corresponding to a count of contacts of the tap from among a plurality of regions constituting a display region of the display,
wherein
the touch sensor includes a first touch sensor that is disposed at a position within a range where a hand of the user almost reaches while the user aboard the vehicle is seated on a seat of the vehicle, the position excluding a steering wheel of the vehicle,
when the touch input into the touch sensor is a first gesture input by the touch or a second gesture input after the tap, the controller performs switching processing to switch from a first display screen displayed by the display to a second display screen different from the first display screen and to cause the display to perform display,
when the count of contacts of the touch of the first gesture input that is input into the first touch sensor is the count of contacts of a first touch, the controller causes the display to display as the second display screen an operation guide screen indicating an operation for adjusting a setting to a vehicle-mounted device included in the vehicle,
when the count of contacts of the touch of the first gesture input that is input into the first touch sensor is a count of contacts of a second touch different from the count of contacts of the first touch, the controller causes the display to display an operation screen for receiving the operation by the user to the vehicle-mounted device as the second display screen,
the controller receives an input tracing the touch sensor in the predetermined direction or in an opposite direction of the predetermined direction, out of the first gesture input by the touch of the count of contacts of the second touch,
when the received first gesture input is the predetermined direction, the controller switches a plurality of types of the operation screen in preset order, and
when the received first gesture input is the opposite direction, the controller switches the plurality of types of the operation screen in order opposite to the order.

5. The input device for the vehicle according to claim 1, wherein
the touch sensor includes a second touch sensor disposed in the steering wheel of the vehicle, and
when the touch input into the second touch sensor is the second gesture input, the controller performs the switching processing.

6. The input device for the vehicle according to claim 1, further comprising the display.

7. The input device for the vehicle according to claim 1, further comprising a guide that is disposed adjacent to the touch sensor and determines a position of the finger.

8. An input method by an input device for a vehicle that performs input for operating a user interface (UI) displayed by a display disposed in the vehicle,
the input device including a dial switch that is disposed adjacent to a first touch sensor and receives dial input, a touch sensor included in the input device including the first touch sensor that is disposed at a position within a range where a hand of a user almost reaches while the user aboard the vehicle is seated on a seat of the vehicle, the position excluding a steering wheel of the vehicle, the input method comprising:
determining whether a touch input with a finger of the user into the touch sensor is a touch in which at least two of the fingers simultaneously makes contact with the touch sensor, selects a region corresponding to a count of the contacts of the touch, from among a plurality of regions constituting a display region of the display, or determining whether the touch input is a tap in which at least one of fingers repeats a contact with the touch sensor within a predetermined time, selects a region corresponding to a count of the contacts of the tap, from among a plurality of regions constituting a display region of the display;
determining whether the touch input is a first gesture input by the touch or a second gesture input after the tap;
as the result of determining the touch input is the first gesture input or the second gesture input, performing switching processing to switch from a first display screen displayed by the display to a second display screen different from the first display screen to cause the display to perform display;
determining whether the count of contacts of the touch of the first gesture input that is input into the first touch sensor is the count of contacts of a first touch;
as the result of determining the count of contacts of the touch is the count of contacts of the first touch, the dial switch is being operated, causing the display to display an operation guide screen, as the second display screen, indicating an operation for adjusting a setting to a vehicle-mounted device included in the vehicle;
determining a type of gesture of the first gesture input that is input into the first touch sensor; and
switching a type of the operation indicated on the operation guide screen according to the type of gesture, and switching a type of the setting adjusted by operating the dial switch.

9. The input device for the vehicle according to claim 4, wherein
when the touch input that is input into the touch sensor is the touch or the tap, after the touch input is performed, the controller displays a gesture guide associating a type of gesture that is input into the touch sensor with an icon indicating a screen to be displayed according to the type of gesture in the selected region of the display.

10. The input device for the vehicle according claim 4, wherein
the touch sensor includes a second touch sensor disposed in the steering wheel of the vehicle, and
when the touch input into the second touch sensor is the second gesture input, the controller performs the switching processing.

11. The input device for the vehicle according to claim 4, further comprising the display.

12. The input device for the vehicle according to claim 4, further comprising a guide that is disposed adjacent to the touch sensor and determines a position of the finger.

* * * * *